US010230967B2

(12) United States Patent
Cho et al.

(10) Patent No.: US 10,230,967 B2
(45) Date of Patent: Mar. 12, 2019

(54) METHOD AND APPARATUS FOR ENCODING MULTILAYER VIDEO, AND METHOD AND APPARATUS FOR DECODING MULTILAYER VIDEO

(71) Applicant: SAMSUNG ELECTRONICS CO., LTD., Suwon-si (KR)

(72) Inventors: Yong-jin Cho, Seoul (KR); Byeong-doo Choi, Suwon-si (KR); Chan-yul Kim, Bucheon-si (KR); Min-woo Park, Yongin-si (KR); Ho-cheon Wey, Seongnam-si (KR); Jin-young Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 388 days.

(21) Appl. No.: 15/096,464

(22) Filed: Apr. 12, 2016

(65) Prior Publication Data

US 2016/0227233 A1 Aug. 4, 2016

Related U.S. Application Data

(63) Continuation of application No. PCT/KR2014/009585, filed on Oct. 13, 2014.
(Continued)

(51) Int. Cl.
*H04N 19/30* (2014.01)
*H04N 19/33* (2014.01)
(Continued)

(52) U.S. Cl.
CPC ............. *H04N 19/33* (2014.11); *H04N 19/30* (2014.11); *H04N 19/44* (2014.11); *H04N 19/52* (2014.11);
(Continued)

(58) Field of Classification Search
CPC ........ H04N 19/30; H04N 19/33; H04N 19/70; H04N 19/597; H04N 21/234327
See application file for complete search history.

(56) References Cited

U.S. PATENT DOCUMENTS

2006/0256851 A1  11/2006  Wang et al.
2007/0086516 A1   4/2007  Lee et al.
(Continued)

FOREIGN PATENT DOCUMENTS

JP        2013-048356 A    3/2013

OTHER PUBLICATIONS

International Search Report for PCT/KR2014/009585 dated Jan. 7, 2015 [PCT/ISA/210].
(Continued)

*Primary Examiner* — Robert J Hance
(74) *Attorney, Agent, or Firm* — Sughrue Mion, PLLC

(57) ABSTRACT

A multi-layer video encoding/decoding method and a multi-layer video encoding/decoding apparatus are provided. In the multi-layer video encoding method, image data is encoded to a multi-layer encoded image, at least one of encoded layers of a target output layer set is determined as an output layer, an index of at least three output layer subsets including at least one output layer from among the encoded layers of the target output layer set are generated based on the determined output layer, and a bitstream including the generated index and the multi-layer encoded image is generated.

13 Claims, 26 Drawing Sheets

Related U.S. Application Data

(60) Provisional application No. 61/890,206, filed on Oct. 12, 2013.

(51) Int. Cl.
*H04N 21/2343* (2011.01)
*H04N 19/70* (2014.01)
*H04N 19/44* (2014.01)
*H04N 19/52* (2014.01)
*H04N 19/593* (2014.01)
*H04N 19/597* (2014.01)
*H04N 19/96* (2014.01)

(52) U.S. Cl.
CPC ......... *H04N 19/593* (2014.11); *H04N 19/597* (2014.11); *H04N 19/70* (2014.11); *H04N 19/96* (2014.11); *H04N 21/234327* (2013.01)

(56) References Cited

U.S. PATENT DOCUMENTS

| | | | |
|---|---|---|---|
| 2008/0095228 A1 | 4/2008 | Hannuksela et al. | |
| 2011/0311207 A1 | 12/2011 | Urabe et al. | |
| 2014/0086336 A1* | 3/2014 | Wang | H04N 19/70 375/240.26 |
| 2014/0119437 A1* | 5/2014 | Chen | H04N 19/597 375/240.12 |
| 2014/0301441 A1* | 10/2014 | Wang | H04N 19/597 375/240.02 |
| 2014/0301463 A1* | 10/2014 | Rusanovskyy | H04N 19/52 375/240.14 |
| 2014/0301476 A1* | 10/2014 | Deshpande | H04N 19/70 375/240.25 |
| 2014/0301477 A1* | 10/2014 | Deshpande | H04N 19/82 375/240.25 |
| 2015/0016532 A1* | 1/2015 | Chen | H04N 19/597 375/240.16 |
| 2015/0016545 A1* | 1/2015 | Ramasubramonian | H04N 19/29 375/240.25 |
| 2015/0103884 A1* | 4/2015 | Ramasubramonian | H04N 19/597 375/240.02 |
| 2016/0255353 A1* | 9/2016 | Deshpande | H04N 19/61 375/240.02 |

OTHER PUBLICATIONS

Written Opinion for PCT/KR2014/009585 dated Jan. 7, 2015 [PCT/ISA/237].

* cited by examiner

FIG. 6A

| vps_extension( ) { | Descriptor |
|---|---|
| ...... | |
| if( NumViews > 1 ) { | |
|   view_id_len_minus1 | u(4) |
|   for( i = 01; i < NumViews; i++ ) | |
|     view_id_val[ i ] | u(v) |
| } | |
| ...... | |
| vps_num_profile_tier_level_minus1 | u(6) |
| for( i = 1; i <= vps_num_profile_tier_level_minus1; i ++ ) { | |
|   vps_profile_present_flag[ i ] | u(1) |
|   if( !vps_profile_present_flag[ i ] ) | |
|     ~~profile_ref_minus1[ i ]~~ profile_ref [i] | u(6) |
|   profile_tier_level( vps_profile_present_flag[ i ], vps_max_sub_layers_minus1 ) | |
| } | |
| ...... | |
| if( numOutputLayerSets > 1 ) | |
|   ~~default_one_target_output_layer_flag~~default_output_layer_idx | ~~u(1)~~u(2) |
| ...... | |
| ~~rep_format_idx_present_flag~~ | ~~u(1)~~ |
| ~~if( rep_format_idx_present_flag )~~ | |
|   ~~vps_num_rep_formats_minus1~~ | ~~u(4)~~ |
| ~~for( i = 0; i <= vps_num_rep_formats_minus1; i++ )~~ | |
|   ~~rep_format( )~~ | |
| ~~if( rep_format_idx_present_flag )~~ | |
|   ~~for( i = 1; i <= vps_max_layers_minus1; i++ )~~ | |
|     ~~if( vps_num_rep_formats_minus1 > 0 )~~ | |
|       ~~vps_rep_format_idx[ i ]~~ | ~~u(4)~~ |

610 — view block
620 — profile_ref
630 — default_output_layer_idx
640 — rep_format block

FIG. 6B

| | | |
|---|---|---|
| 650 { | single_rep_format_flag —— 651 | u(1) |
| | if ( !single_ref_format_flag ) { | |
| | rep_format_idx_present_flag | u(1) |
| | if( rep_format_idx_present_flag ) | |
| | vps_num_rep_formats_minus1‡2 | u(4) |
| | for( i = 0; i <= vps_num_rep_formats_minus1‡2; i++ ) | |
| | rep_format( ) | |
| | if( rep_format_idx_present_flag ) | |
| | for( i = 1; i <= vps_max_layers_minus1‡2; i++ ) | |
| | vps_rep_format_idx[ i ] | u(4) |
| | } | |
| | ...... | |
| | ~~cross_layer_irap_aligned_flag~~ —— 660 | ~~u(1)~~ |
| | | |
| | ~~single_layer_for_non_irap_flag~~ —— 670 | ~~u(1)~~ |
| | ...... | |
| 680 { | vps_vui_present_flag | u(1) |
| | if ( vps_vui_present_flag ) | |
| | vps_vui_offset | u(16) |
| | ...... | |
| | } | |

FIG. 14
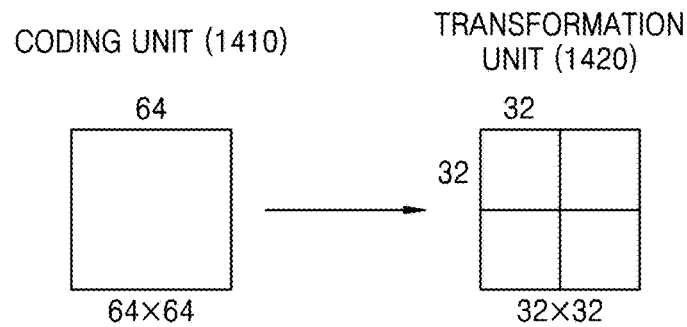
FIG. 15
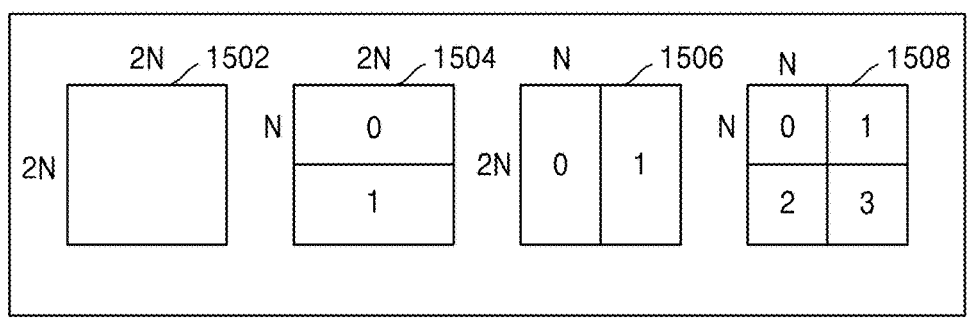
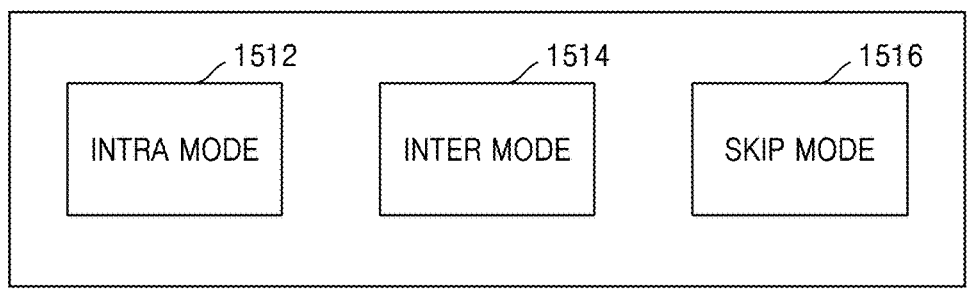
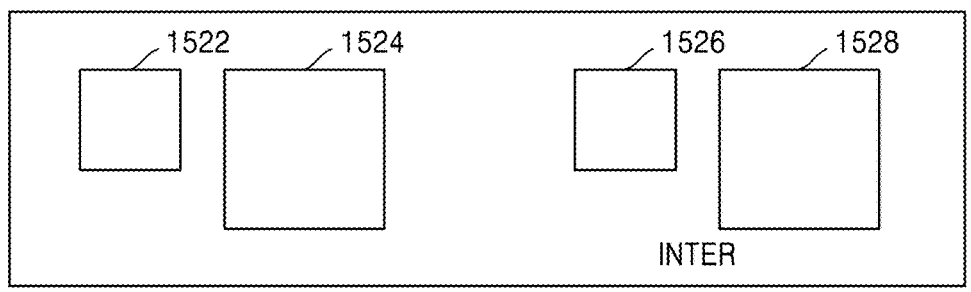

CODING UNIT (1710)

PREDICTION UNIT (1760)

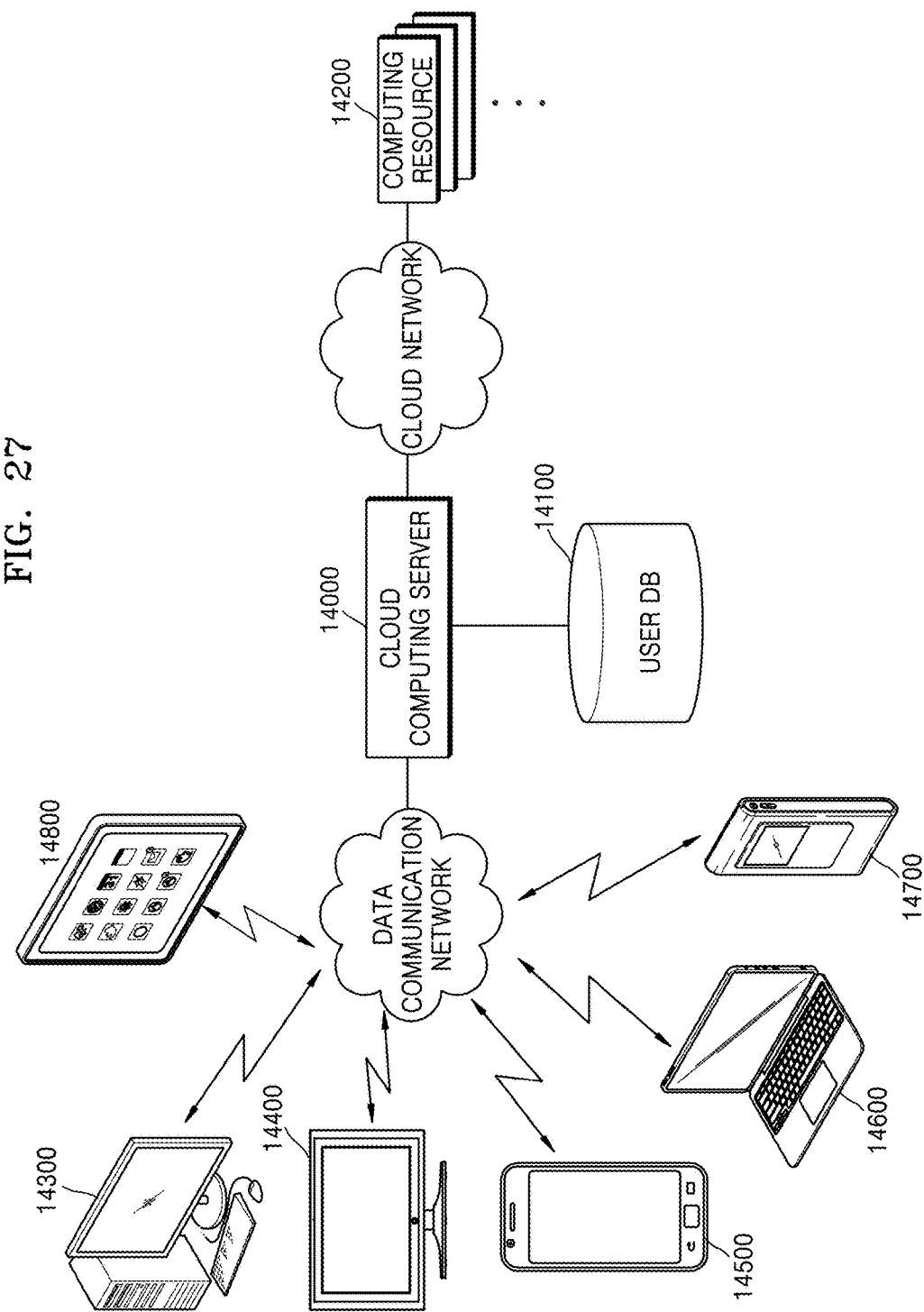

METHOD AND APPARATUS FOR ENCODING MULTILAYER VIDEO, AND METHOD AND APPARATUS FOR DECODING MULTILAYER VIDEO

TECHNICAL FIELD

The present invention relates to methods and apparatuses for encoding and decoding a multi-layer video, such as a scalable video or a multi-view video, and more particularly, to a high-level syntax structure for signaling a multi-layer video.

BACKGROUND ART

Generally, image data is encoded by a codec following a designated data compression standard, e.g., a moving picture expert group (MPEG) compression standard, and is stored in a data storage medium or is transmitted via a communication channel in the form of bit streams.

Scalable video encoding (SVC) is a video compression method for suitably adjusting a data amount and transmitting data in correspondence to various types of communication networks and terminals. In SVC, a video encoding method capable of adaptively providing a service to various transmission networks and various reception terminals by using a single video stream is provided.

Due to advancements with three-dimensional (3D) multi-media apparatuses and 3D multi-media content, multi-view video coding (MVC) for 3D video coding is being widely used.

In conventional SVC and MVC, video is encoded according to a limited-encoding method based on a macroblock having a predetermined size.

DETAILED DESCRIPTION OF THE INVENTION

Technical Problem

The present invention provides multi-layer video encoding and decoding methods that improve coding efficiency.

Technical Solution

According to an aspect of the present invention, there is provided a multi-layer video decoding method including obtaining an index of an output layer subset including at least one output layer from among layers of a target output layer set, from a multi-layer video bitstream; determining one of at least three output layer subsets by using the obtained index; and decoding an image including an output layer included in the determined output layer subset.

Advantageous Effects

By using multi-layer video coding and decoding methods according to various embodiments, compression efficiency is improved.

In the multi-layer video encoding and decoding methods according to various embodiments, various output layer subsets are determined, and an output layer included in an output layer subset is output and displayed.

BRIEF DESCRIPTION OF THE DRAWINGS

FIGS. 6A and 6B illustrate a video parameter set (VPS) extension syntax according to an embodiment of the present invention.

FIG. 14 is a diagram for describing a relationship between a coding unit and transformation units, according to various embodiments.

FIG. 15 is a diagram for describing pieces of encoding information according to various embodiments.

FIG. 27 is a diagram illustrating a network structure of a cloud computing system using a video encoding apparatus and a video decoding apparatus, according to various embodiments.

BEST MODE

Figure 1A:
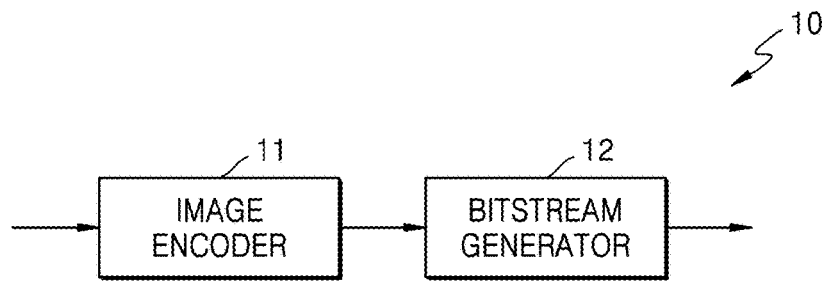
FIG. 1A is a block diagram of a structure of a multi-layer video encoding apparatus according to an embodiment of the present invention.

According to an aspect of the present invention, there is provided a multi-layer video decoding method including obtaining an index of an output layer subset including at least one output layer from among layers of a target output layer set, from a multi-layer video bitstream; determining one of at least three output layer subsets by using the obtained index; and decoding an image including an output layer included in the determined output layer subset.

The multi-layer video decoding method may further include determining one of a plurality of output layer sets included in an output layer set group, as the target output layer set.

The determining of the one of the at least three output layer subsets by using the obtained index may include determining an output layer subset including a lowermost layer from among the layers included in the target output layer set, by using the obtained index.

The determining of the one of the at least three output layer subsets by using the obtained index may include, when the obtained index has a predetermined first value, obtaining a flag representing whether each of the layers included in the target output layer set is an output layer; and determining an output layer from among the layers included in the target output layer set, by using the obtained flag, and determining an output layer subset including the determined output layer.

The obtaining of the index may include obtaining a Video Parameter Set Network Abstraction Layer (VPS NAL) unit including the index from the multi-layer video bitstream; and obtaining the index by using the VPS NAL unit.

The determining of the one of the at least three output layer subsets by using the acquired index may include determining an output layer subset including a layer except for a layer for auxiliary image data from among the layers included in the target output layer set, by using the obtained index.

The output layer may be a layer that is to be output and displayed.

According to an aspect of the present invention, there is provided a multi-layer video encoding method including encoding image data to a multi-layer encoded image; determining at least one of encoded layers of a target output layer set, as an output layer; generating an index of at least three output layer subsets including at least one output layer from among the encoded layers of the target output layer set, based on the determined output layer; and generating a bitstream including the generated index and the multi-layer encoded image.

The determining of the at least one of the encoded layers of the target output layer set, as the output layer, may include determining as the output layer at least one of layers of each of a plurality of output layer sets included in an output layer set group including the target output layer set.

The generating of the index may include, when a lowermost layer among the layers included in the target output layer set is determined as the output layer, generating the index to have a predetermined first value.

The generating of the index may include generating a flag representing whether each of the layers included in the target output layer set is an output layer; and generating the index to have a predetermined first value.

The generating of the index may include, when a layer except for a layer for auxiliary image data from among the layers included in the target output layer set is determined as the output layer, generating the index to have a predetermined first value.

The generating of the bitstream including the generated index and the multi-layer encoded image may include generating a Video Parameter Set Network Abstraction Layer (VPS NAL) unit including the generated index; and generating a bitstream including the VPS NAL unit.

The determined output layer may be a layer that is to be output and displayed.

According to an aspect of the present invention, there is provided a multi-layer video decoding apparatus including a bitstream obtainer configured to obtain a multi-layer video bitstream including an encoded image; and an image decoder configured to obtain an index of an output layer subset including at least one output layer from among layers of a target output layer set, from the multi-layer video bitstream, to determine one of at least three output layer subsets by using the obtained index, and to decode an image including an output layer included in the determined output layer subset.

According to an aspect of the present invention, there is provided a multi-layer video encoding apparatus including an image encoder configured to encode image data to a multi-layer encoded image, to determine at least one layer from among encoded layers of a target output layer set, and to generate an index of at least three output layer subsets including the at least one output layer from among the encoded layers of the target output layer set, based on the determined output layer; and a bitstream generator configured to generate a bitstream including the generated index and the multi-layer encoded image.

According to an aspect of the present invention, there is provided a computer-readable recording medium having recorded thereon a program for executing the multi-layer video decoding method.

According to an aspect of the present invention, there is provided a computer-readable recording medium having recorded thereon a program for executing the multi-layer video encoding method.

Mode of the Invention

Multi-layer video encoding apparatuses, multi-layer video decoding apparatuses, multi-layer video encoding methods, and multi-layer video decoding methods according to various embodiments will now be described with reference to FIGS. 1A-7. Video encoding apparatuses, video decoding apparatuses, video encoding methods, and video decoding methods based on a coding unit having a tree structure according to various embodiments will be described with reference to FIGS. 8-20. Various embodiments to which the multi-layer video encoding methods, the multi-layer video decoding methods, the video encoding methods, and the video decoding methods according to the embodiments of FIGS. 1A-20 are applicable will be described with reference to FIGS. 21-27. Hereinafter, an 'image' may denote a still image or a moving image of a video, or a video itself.

First, multi-layer video encoding apparatuses, multi-layer video encoding methods, multi-layer video decoding apparatuses, and multi-layer video decoding methods according to various embodiments will be described with reference to FIGS. 1A-7.

FIG. 1A is a block diagram of a structure of a multi-layer video encoding apparatus according to an embodiment of the present invention.

Referring to FIG. 1A, a multi-layer video encoding apparatus 10 includes an image encoder 11 and a bitstream generator 12.

The multi-layer video encoding apparatus 10 according to various embodiments may classify and encode a plurality of video streams for each layer according to scalable video coding (SVC). The multi-layer video encoding apparatus 10 may encode base layer images and enhancement layer images to different layers.

For example, a multi-view video may be encoded according to SVC. Left view images may be encoded as base layer images, and right view images may be encoded as enhancement layer images. Alternatively, center view images, the left view images, and the right view images may be encoded. The center view images may be encoded as the base layer images, the left view images may be encoded as first enhancement layer images, and the right view images may be encoded as second enhancement layer images. An encoding result of the base layer images may be output in a base layer stream. An encoding result of the first enhancement layer images may be output in a first enhancement layer stream, and an encoding result of the second enhancement layer images may be output in a second enhancement layer stream.

In the presence of three or more enhancement layers, base layer images, first enhancement layer images, second enhancement layer images, . . . , and Kth enhancement layer images may be encoded. Accordingly, an encoding result of the base layer images may be output in the base layer stream, and encoding results of the first enhancement layer images, second enhancement layer images, . . . , and Kth enhancement layer images may be respectively output in first, second, . . . , and Kth enhancement layer streams.

The multi-layer video encoding apparatus 10 according to various embodiments may perform inter prediction for predicting a current image by referring to images of a single layer. A motion vector indicating motion information between the current image and a reference image and a residual between the current image and the reference image may be generated through inter prediction.

The multi-layer video encoding apparatus 10 according to various embodiments may perform inter-layer prediction for predicting enhancement layer images by referring to base layer images. The multi-layer video encoding apparatus 10 may perform inter-layer prediction for predicting second enhancement layer images by referring to first enhancement layer images. A position differential component between the current image and a reference image of a different layer and a residual between the current image and the reference image of the different layer may be generated through inter-layer prediction.

When the multi-layer video encoding apparatus 10 according to an embodiment allows two or more enhancement layers, the multi-layer video encoding apparatus 10 may perform inter-layer prediction between images of a single base layer and two or more enhancement layer images according to a multi-layer prediction structure.

An inter layer prediction structure will be described in detail later with reference to FIG. 7.

The multi-layer video encoding apparatus 10 according to various embodiments encodes each video image based on blocks of the each video image according to each layer. A block may have a square shape, a rectangular shape, or any geometric shape and is not limited to a data unit having a predetermined size. A block according to an embodiment may be a largest coding unit, a coding unit, a prediction unit, a transformation unit, or the like from among coding units according to a tree structure. For example, the multi-layer video encoding apparatus 10 may split images following high efficiency video coding (HEVC) standard into blocks having a quad-tree structure and encode the split images. Video encoding and decoding methods based on coding units having a tree structure will be described later with reference to FIGS. 8-20. Inter prediction and inter layer prediction may be performed based on data units, such as coding units, prediction units, or transformation units.

The image encoder 11 according to various embodiments may encode an image sequence according to at least one layer. The image encoder 11 may generate symbol data by performing source coding operations including inter prediction or intra prediction, per layer. For example, the image encoder 11 generates symbol data by performing transformation and quantization on an image block including result data of performing inter prediction or intra prediction on image samples, and performs entropy encoding on the symbol data. The bitstream generator 12 may generate a bitstream including a result of the entropy encoding on the symbol data.

The image encoder 11 may encode an image sequence for each layer, and the bitstream generator 12 may generate each bitstream. As described above, the image encoder 11 may encode a current layer image sequence by referring to symbol data of a layer different from the current layer image sequence, via inter-layer prediction. Accordingly, the image encoder 11 according to various embodiments may encode an image sequence of each layer by referring to an image sequence of a different layer or the same layer according to a prediction mode. For example, in an intra mode, a current sample may be predicted by using adjacent samples in a current image, and in an inter mode, a current image may be predicted by using another image in the same layer. In an inter-layer prediction mode, a current image may be predicted by using a reference image of the same picture order count (POC) as the current image from among other layer images.

The image encoder 11 may encode a multi-view video, and encode an image sequence of different views per layer. An inter-layer prediction structure regarding the multi-view video may be an inter-view prediction structure since a current view image is encoded by referring to another view image.

The image encoder 11 generates a multi-layer encoded image by receiving and encoding image data including a multi-layer video. The image encoder 11 corresponds to a video coding layer that encodes an input video. The image encoder 11 may encode each picture included in a multi-layer video, based on a coding unit having a tree structure, as illustrated in FIGS. 8-25.

The bitstream generator 12 corresponds to a network abstraction layer (NAL) which adds the multi-layer encoded image generated by the image encoder 11 and additional information to a transmission data unit having a predetermined format and outputs a result of the addition. The transmission data unit may be a NAL unit. The bitstream generator 12 adds the multi-layer encoded image and the additional information to a NAL unit and outputs the NAL unit including the multi-layer encoded image and the additional information. The bitstream generator 12 may output a bitstream generated using the NAL unit.

The multi-layer video encoding apparatus 10 according to an embodiment of the present invention encodes image data into a multi-layer encoded image. The multi-layer video encoding apparatus 10 may generate additional information including an index indicating an output layer subset, and may generate a bitstream including the generated index and the multi-layer encoded image.

The output layer subset denotes a group including at least one layer that is to be output by a multi-layer video decoding apparatus and displayed.

In other words, encoded layers are decoded via intra prediction, inter prediction, and inter-layer prediction, and an image is reconstructed based on the decoded layers. In this case, all of the decoded layers may not be output and displayed, but only some decoded layers may be output and displayed.

For example, spatial scalable bitstreams include encoded layers having different resolutions. When a layer with a low resolution is first decoded, inter-layer prediction is performed by referring to the layer with the low resolution, and thus a layer with a higher resolution than the layer with the low resolution may be decoded.

When a layer with a high resolution is decoded, a layer with a high resolution is output and displayed, and thus a user may view an image with a high resolution.

However, a result of decoding the layer with the low resolution does not need to be output and displayed. In other words, a result of decoding a layer with a high resolution is only different from a layer with a low resolution in terms of resolution and includes the same information as that included in the layer with the low resolution, the layer with the low resolution does not need to be output.

Multi-view scalable bitstreams include a result of encoding layers having different views. For example, when a base layer representing a left view image is first decoded, inter-layer prediction is performed by referring to the base layer, and thus enhancement layers representing a right view image and a center view image may be decoded. When layers representing a right view and a center view are decoded, not only layers representing a right view and a center view are output and displayed, but also a layer representing a left view is output and displayed.

The image encoder 11 may encode the image data into the multi-layer encoded image and then determine, as an output layer, at least one of the encoded layers included in a target output layer set.

In this regard, the target output layer set denotes a group including at least one output layer included in a multi-layer video.

When the multi-layer video encoding apparatus 10 generates a bitstream, all of the layers included in multi-layer encoded data are not necessary, but only some layers may be necessary. For example, the target output layer set may include some of the layers included in the multi-layer encoded data, and the multi-layer video encoding apparatus 10 may generate a bitstream including encoded layers of the target output layer set.

For example, when a mobile terminal tries to reproduce a spatially-scalable multi-layer video, even when the mobile terminal decodes a layer with a somewhat low resolution and reconstructs and displays an image, a viewer may view the image without greatly suffering inconvenience.

The multi-layer video encoding apparatus 10 generates a bitstream including only a layer with a low resolution and a layer with an intermediate resolution, from multi-layer encoded data including the layer with the low resolution, the layer with the intermediate resolution, and a layer with a high resolution. The mobile terminal may obtain the bitstream and decode the bitstream to reconstruct an image.

The multi-layer video encoding apparatus 10 may determine several output layer sets that are related to the multi-layer encoded image. In other words, the multi-layer video encoding apparatus 10 may determine an output layer set group including several multi-layer sets. The output layer set group includes a target output layer set.

The image encoder 11 may generate additional information about the number of output layer sets, based on the determined several output layer sets. A detailed description of the several output layer sets will be given later with reference to FIG. 5A.

The image encoder 11 may determine an output layer from among the layers included in the target output layer set. The image encoder 11 may generate an index of an output layer subset including at least one output layer from among the layers included in the target output layer set.

In detail, when the image encoder 11 determines an output layer, the image encoder 11 may generate an index representing one of three or more output layer subsets each including the determined output layer.

In this regard, the output layer subset denotes a subset including output layers from among the layers included in the target output layer set. For example, when an apparatus supporting an image with an intermediate resolution tries to reproduce a spatially-scalable multi-layer video, the image encoder 11 may determine as an output layer a layer with an intermediate resolution included in a target output layer set, including a layer with a low resolution and the layer with the intermediate resolution, and thus the output layer subset may include the layer with the intermediate resolution.

When an apparatus supporting an image with a high resolution tries to reproduce a spatially-scalable multi-layer video, the image encoder 11 may determine as an output layer a layer with a high resolution included in a target output layer set, including a layer with a low resolution, a layer with an intermediate resolution, and the layer with the high resolution, and thus the output layer subset may include the layer with the high resolution.

The image encoder 11 may determine an output layer from among the layers included in each of a plurality of output layer sets included in an output layer set group. In this case, the index generated by the image encoder 11 may be an index representing one of three or more output layer subset groups each including the determined layer.

The multi-layer video encoding apparatus 10 may generate a bitstream including the index, and a multi-layer video decoding apparatus may obtain the bitstream and determine an output layer subset by using the index obtained from the bitstream.

In detail, when the multi-layer video decoding apparatus obtains the bitstream generated by the multi-layer video encoding apparatus 10, the multi-layer video decoding apparatus obtains an index from the obtained bitstream. The multi-layer video decoding apparatus may determine an output layer set group based on information about the number of output layer sets included in the bitstream, and determine a target layer set from the determined output layer set group. At this time, the multi-layer video decoding apparatus may obtain the index representing the target layer set included in the output layer set group from the bitstream, and determine the target layer set based on the obtain the index. However, embodiments of the present invention are not limited thereto, and the multi-layer video decoding apparatus may determine the target layer set by using any of various methods. The multi-layer video decoding apparatus may determine a subset included in the target layer set represented by the index from among the output layer subset group.

An output layer subset according to an embodiment may be a set including a layer having a highest layer identifier among the target output layer set. An output layer subset according to another embodiment may be a set including all of the layers included in the target output layer set.

An output layer subset according to an embodiment may be a set including output layers individually determined among the target output layer set. In the case of the output layer subset, the image encoder 11 may additionally generate a flag representing whether each of the layers included in the target output layer set is an output layer.

The multi-layer video encoding apparatus 10 may determine an output layer from among the layers included in each of a plurality of output layer sets included in an output layer set group. When the multi-layer video encoding apparatus 10 generates an index representing one of three or more output layer subset groups each including the determined output layer, the multi-layer video encoding apparatus 10 may generate a flag representing each output layer among the layers included in each of the plurality of output layer sets included in the output layer set group.

When the image encoder 11 determines as an output layer a lowermost layer from among the layers included in the target output layer set, the image encoder 11 may generate an index representing that the lowermost layer included in the target output layer set is an output layer.

When the image encoder 11 determines, as output layers, layers except for a layer for auxiliary image data among the layers of the target output layer set, the image encoder 11 may generate an index representing that the layers except for the layer for auxiliary image data among the layers of the target output layer set are output layers. An auxiliary image is an image which is referred to reconstruct a primary image. An alpha plane image and a depth image may be representative examples of the auxiliary image. For example, when an auxiliary image and a primary image are included in the target output layer set, the image encoder 11 may exclude a layer for the auxiliary image from the target output layer set and determine a remaining layer as an output layer. Embodiments of the present invention are not limited thereto, and various output layer subsets including at least one output layer among the layers included in a target output layer set may be determined.

When the image encoder 11 determines the output layer, the image encoder 11 may generate an index of three or more output layer subsets including at least one output layer among the encoded layers of the target output layer set, based on the determined layer.

The bitstream generator 12 may generate a Video Parameter Set Network Abstraction Layer (VPS NAL) unit including the generated index, and may generate a bitstream including the VPS NAL unit. The bitstream generator 12 may generate a bitstream including the index and the multi-layer encoded image generated by the image encoder 11. The index included in the bitstream may be an index of three or more output layer subsets including an output layer among the encoded layers included in the target output layer set. In this case, the bitstream generator 12 may generate a bitstream such that the encoded layers included in the target output layer set are included in the bitstream.

Embodiments of the present invention are not limited thereto, and the index included in the bitstream may be an index representing one output layer subset from among an output layer subset group including an output layer among the layers included in each of the plurality of output layer sets included in the output layer set group. In this case, an index representing the target output layer set among the output layer subset group may be additionally included in the bitstream.

Figure 1B:
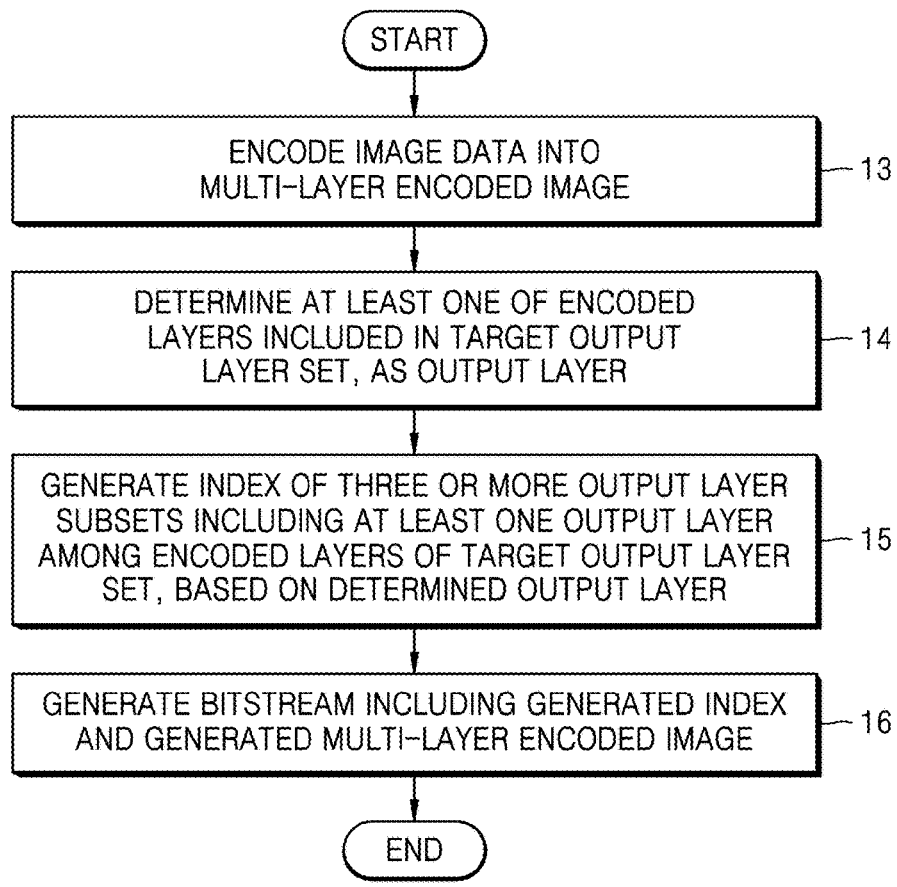
FIG. 1B is a flowchart of a multi-layer video encoding method according to an embodiment of the present invention.

FIG. 1B is a flowchart of a multi-layer video encoding method according to an embodiment of the present invention.

Referring to FIG. 1B, in operation 13, the multi-layer video encoding apparatus 10 may encode image data into a multi-layer encoded image.

In operation 14, the multi-layer video encoding apparatus 10 may determine an output layer from among the encoded layers included in a target output layer set.

The multi-layer video encoding apparatus 10 according to another embodiment of the present invention may determine an output layer from among the layers included in each of a plurality of output layer sets included in an output layer set group.

In operation 15, the multi-layer video encoding apparatus 10 may generate an index of three or more output layer subsets including at least one output layer among the encoded layers of the target output layer set, based on the determined layer.

When the multi-layer video encoding apparatus 10 determines, as an output layer, a lowermost layer from among the encoded layers included in the target output layer set, the multi-layer video encoding apparatus 10 may generate an index by setting an index value as a predetermined first value.

The multi-layer video encoding apparatus 10 may additionally generate a flag representing whether each of the layers included in the target output layer set is an output layer. In this case, the multi-layer video encoding apparatus 10 may generate an index indicating that an output layer subset including an output layer is determined, based on the generated flag.

When the multi-layer video encoding apparatus 10 determines, as an output layer, a layer except for a layer for an auxiliary image from among the layers included in the target output layer set, the multi-layer video encoding apparatus 10 may generate an index by setting an index value as a predetermined first value.

The multi-layer video encoding apparatus 10 according to another embodiment may generate an index representing one of three or more output layer subsets each including the output layer. In this case, the multi-layer video encoding apparatus 10 may generate a flag representing an output layer from among the layers included in each of the plurality of output layer sets included in the output layer set group.

In operation 17, the multi-layer video encoding apparatus 10 may generate a bitstream including the generated index and the generated multi-layer encoded image. The bitstream generator 12 may generate a bitstream such that the encoded layers included in the target output layer set are included in the bitstream.

In detail, the multi-layer video encoding apparatus 10 may generates a VPS NAL unit including the generated index. A VPS includes information that is applied to multi-layer image sequences included in a multi-layer video. The multi-layer video encoding apparatus 10 may generate a bitstream including the VPS NAL unit.

The index included in the bitstream may be an index representing one output layer subset from among an output layer subset group including an output layer among the layers included in each of the plurality of output layer sets included in the output layer set group.

Figure 2A:
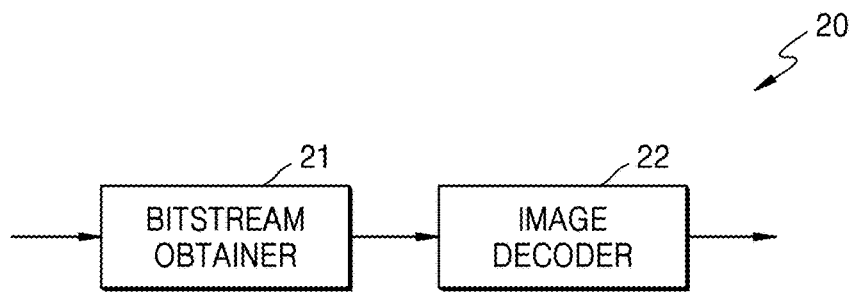
FIG. 2A is a block diagram of a structure of a multi-layer video decoding apparatus according to an embodiment of the present invention.

FIG. 2A is a block diagram of a structure of a multi-layer video decoding apparatus according to an embodiment of the present invention.

Referring to FIG. 2A, a multi-layer video decoding apparatus 20 may include a bitstream obtainer 21 and an image decoder 22.

The multi-layer video decoding apparatus 20 may receive a base layer stream and an enhancement layer stream. The multi-layer video decoding apparatus 20 may receive, as a base layer stream, the base layer stream including encoded data of base layer images and may receive, as the enhancement layer stream, an enhancement layer stream including encoded data of enhancement layer images, via the SVC scheme.

The multi-layer video decoding apparatus 20 may decode a plurality of layer streams via the SVC scheme. The multi-layer video decoding apparatus 20 may reconstruct the base layer images by decoding the base layer stream, and may reconstruct the enhancement layer images by decoding the enhancement layer stream.

For example, a multi-view video may be encoded according to the SVC scheme. For example, left view images may be reconstructed by decoding the base layer stream, and right view images may be reconstructed by decoding the enhancement layer stream. As another example, center view images may be reconstructed by decoding the base layer stream. The left view images may be reconstructed by further decoding a first enhancement layer stream in addition to the base layer stream. The right view images may be reconstructed by further decoding a second enhancement layer stream in addition to the base layer stream.

Also, when a number of enhancement layers is at least three, first enhancement layer images of a first enhancement layer may be reconstructed from a first enhancement layer stream, and second enhancement layer images may be further reconstructed by further decoding a second enhancement layer stream. K-th enhancement layer images may be further reconstructed by further decoding a K-th enhancement layer stream in addition to the first enhancement layer stream.

The video stream decoding apparatus 20 may obtain encoded data of the base layer images and the enhancement layer images from the base layer stream and the enhancement layer stream, and may further obtain a motion vector generated via inter prediction and disparity information generated via inter-layer prediction.

For example, the video stream decoding apparatus 20 may decode inter predicted data according to layers, and decode inter-layer predicted data between a plurality of layers. Reconstruction may be performed via motion compensation and inter-layer decoding based on a coding unit or a prediction unit according to an embodiment.

Regarding each layer stream, images may be reconstructed by performing motion compensation for a current image by referring to reconstructed images predicted via inter prediction of the same layer. Motion compensation is an operation of reconstructing a reconstructed image of a current image by composing a reference image determined by using a motion vector of the current image and a residual of the current image.

Also, the video stream decoding apparatus 20 according to an embodiment may perform inter-layer decoding by referring to the base layer images so as to reconstruct the enhancement layer images predicted via inter-layer prediction. Inter-layer decoding is an operation of reconstructing a reconstructed image of a current image by composing a reference image of a different layer, which is determined by using disparity information of the current image, and a residual of the current image.

The video stream decoding apparatus 20 according to an embodiment may perform inter-layer decoding for reconstructing second enhancement layer images predicted by referring to first enhancement layer images.

The video stream decoding apparatus 20 performs decoding according to blocks of an image of each video. A block according to an embodiment may be a largest coding unit, a coding unit, a prediction unit, a transformation unit, or the like from among coding units according to a tree structure. For example, the video stream decoding apparatus 20 may reconstruct image sequences by decoding each layer stream based on blocks of a quad-tree structure determined according to the HEVC standard.

The image decoder 22 may obtain symbol data reconstructed via entropy decoding according to layers. The image decoder 22 may reconstruct quantized transformation coefficients of a residual by performing inverse quantization and inverse transformation by using the symbol data. The image decoder 22 according to another embodiment may receive a bitstream of the quantized transformation coefficients. The residual of images may be reconstructed as results of performing inverse quantization and inverse transformation on the quantized transformation coefficients.

The image decoder 22 according to various embodiments may reconstruct an image sequence according to layers by decoding a bitstream received according to layers.

The image decoder 22 may generate reconstructed images of an image sequence according to layers via motion compensation between the same layer images and via inter-layer prediction between different layer images.

Accordingly, the image decoder 22 according to various embodiments may decode an image sequence of each layer by referring to an image sequence of the same layer or an image sequence of a different layer, according to a prediction mode. For example, in an intra prediction mode, a current block may be reconstructed by using adjacent samples in the same image, and in an inter prediction mode, a current block may be reconstructed by referring to another image of the same layer. In an inter-layer prediction mode, a current block may be reconstructed by using a reference image to which the same POC as a current image is assigned from among images of a different layer.

The bitstream obtainer 21 according to an embodiment obtains a multi-layer video stream of an encoded image. The bitstream obtainer 21 may include a receiver to perform functions of the receiver.

The image decoder 22 according to an embodiment obtains, from the multi-layer video stream, an index of three or more output layer subsets including at least one output layer from among the layers of a target output layer set.

The image decoder 22 may determine one from among the three or more output layer subsets by using the obtained index. The obtained index may represent three or more output layer subset groups including an output layer from among the layers included in each of a plurality of output layer sets included in an output layer set group. In this case, the image decoder 22 may determine one of the plurality of output layer sets as the target output layer set and may determine an output layer subset included in the target output layer set from among the output layer subsets included in the output layer subset group by using the obtained index.

The image decoder 22 may decode an image including an output layer included in the output layer subset. The output layer is a layer that is to be output and displayed.

The image decoder 22 may determine an output layer subset including a lowest layer from among the layers included in the target output layer set by using the obtained index.

The image decoder 22 may determine an output layer subset including a layer except for a layer for auxiliary image data from among the layers included in the target output layer set, by using the obtained index.

The image decoder 22 may determine, as an output layer, the layer except for the layer for the auxiliary image data from among the layers included in the target output layer set, by using the obtained index.

The image decoder 22 may obtains a VPS NAL unit including an index from the multi-layer video stream and may obtain the index from the obtained VPS NAL unit.

Figure 2B:
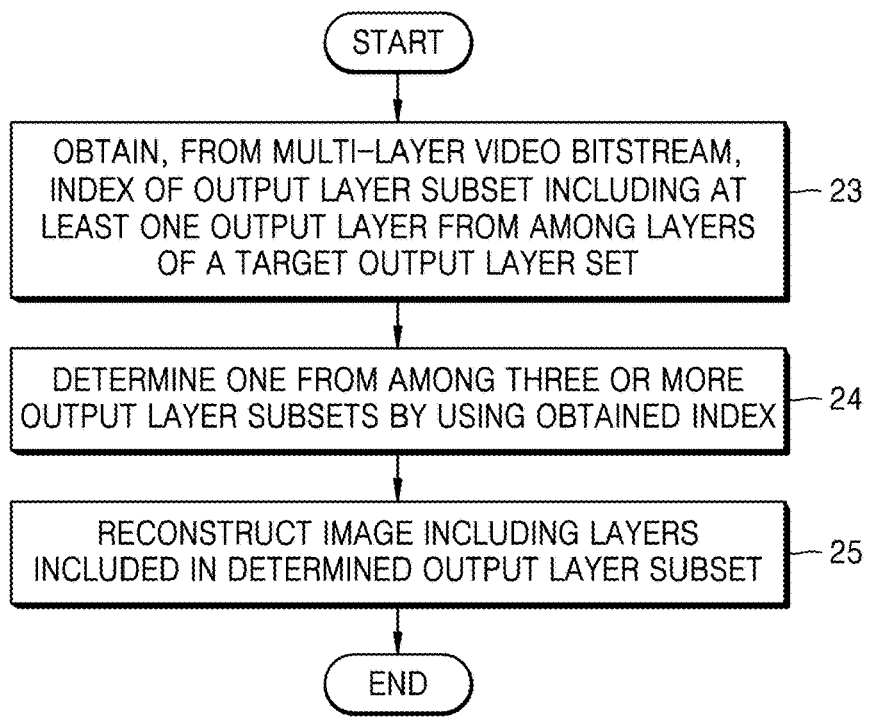
FIG. 2B is a flowchart of a multi-layer video decoding method according to an embodiment of the present invention.

FIG. 2B is a flowchart of a multi-layer video decoding method according to an embodiment of the present invention.

In operation 23, the multi-layer video decoding apparatus 20 may obtain, from a multi-layer video bitstream, an index of an output layer subset including at least one output layer from among the layers of a target output layer set.

In detail, the multi-layer video decoding apparatus 20 may obtain a VPS NAL unit including an index from the multi-layer video stream and may obtain the index from the obtained VPS NAL unit.

The obtained index may be an index representing one of three or more output layer subset groups including an output layer from among the layers included in each of a plurality of output layer sets included in an output layer set group.

In operation 24, the multi-layer video decoding apparatus 20 may determine one from among the three or more output layer subsets by using the obtained index.

In detail, the multi-layer video decoding apparatus 20 may determine a subset including a lowermost layer from among the layers of the target output layer set by using the obtained index.

When the obtained value has a predetermined first value, the multi-layer video decoding apparatus 20 may obtain a flag representing whether each of the layers of the target output layer set is an output layer. The multi-layer video decoding apparatus 20 may determine an output layer included in the target output layer set by using the obtained flag, and may determine an output layer subset including the determined output layer.

The multi-layer video decoding apparatus 20 determines, as a target output layer set, one of a plurality of output layer sets included in an output layer set group, and determines an output layer subset included in the target output layer set from among an output layer subset group, based on the index.

In operation 25, the multi-layer video decoding apparatus 20 may decode an image including layers included in the determined output layer subset.

Figure 3:
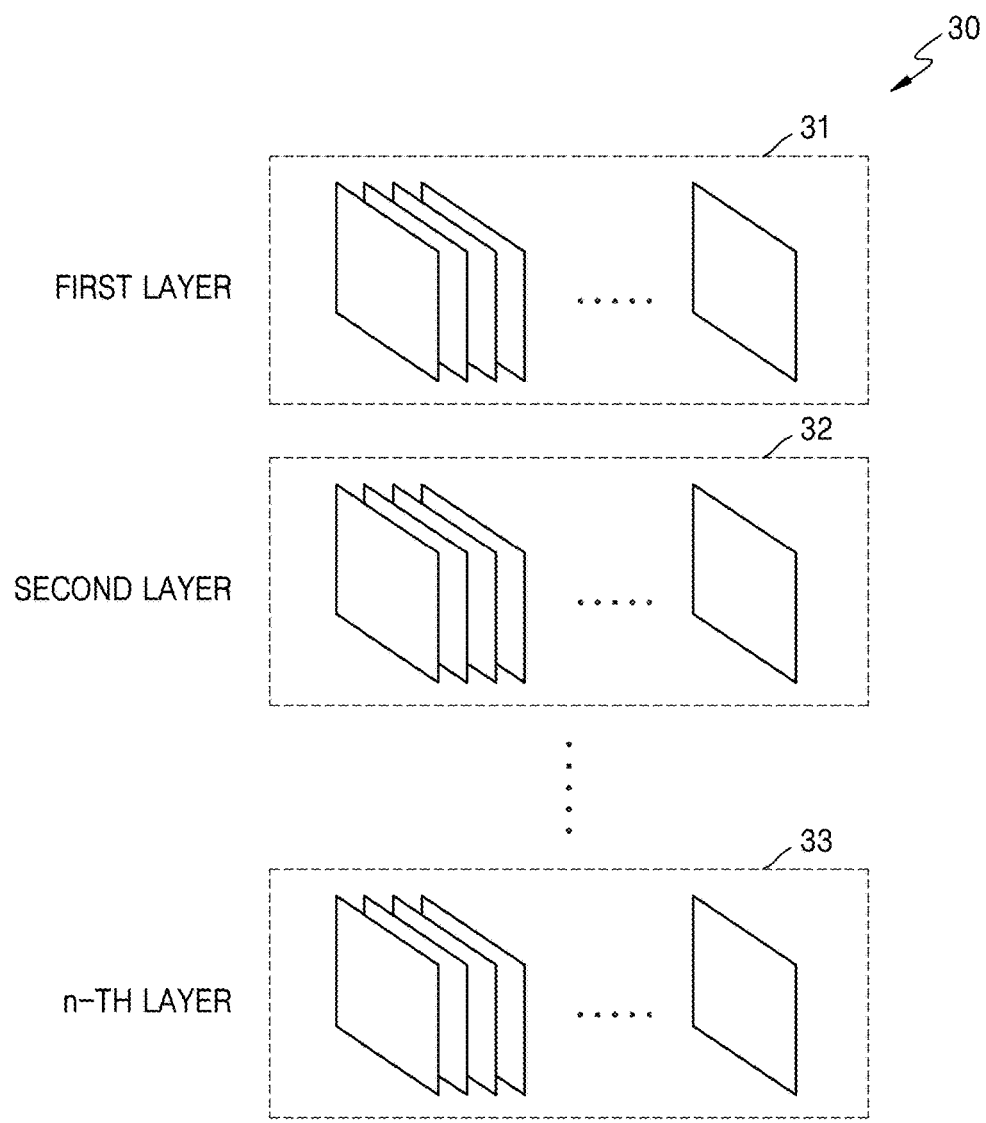
FIG. 3 illustrates a multi-layer video according to an embodiment of the present invention.

FIG. 3 illustrates a multi-layer video according to an embodiment of the present invention.

In order to provide optimal services in various network environments and various terminals, the multi-layer video encoding apparatus 10 may encode multi-layer image sequences having various spatial resolutions, various qualities, various frame-rates, and different views and output a scalable bitstream. In other words, the multi-layer video encoding apparatus 10 may encode an input image according to various scalability types to generate and output a scalable video bitstream. Scalability includes temporal scalability, spatial scalability, quality scalability, multi-view scalability, and a combination thereof. These scalabilities may be classified by types. Scalabilities in each scalability type may be further classified by dimension identifiers (IDs).

For example, scalability has a scalability type, such as temporal scalability, spatial scalability, quality scalability, or multi-view scalability. Scalabilities in each type may be classified by scalability dimension IDs. For example, if a scalability type has different scalabilities, the different scalabilities may have different dimension IDs. For example, a higher scalability dimension may be allocated to a higher-dimensional scalability of a scalability type.

When a bitstream is capable of being divided into valid sub-streams, the bitstream is referred to as being scalable. A spatially scalable bitstream includes sub-streams having various resolutions. A scalability dimension is used to distinguish different scalabilities of an identical scalability type from one another. The scalability dimension may be expressed as a scalability dimension ID.

For example, a spatially scalable bitstream may be divided into sub-streams having different resolutions, such as quarter video graphics array (QVGA), video graphics array (VGA), and wide video graphics array (WVGA) sub-streams. For example, layers having different resolutions may be distinguished from one another by using dimension IDs. For example, the QVGA sub-stream may have a spatial scalability dimension ID of 0, the VGA sub-stream may have a spatial scalability dimension ID of 1, and the WVGA sub-stream may have a spatial scalability dimension ID of 2.

A temporally scalable bitstream includes sub-streams having various frame rates. For example, the temporally scalable bitstream may be divided into sub-streams having a frame rate of 7.5 Hz, a frame rate of 15 Hz, a frame rate of 30 Hz, and a frame rate of 60 Hz. A bitstream that is scalable in terms of quality may be divided into sub-streams having different qualities according to a Coarse-Grained Scalability (CGS) method, a Medium-Grained Scalability (MGS) method, and a Fine-Grained Scalability (FGS) method. Temporal scalabilities may be identified using different dimensions according to different frame rates, and quality scalabilities may also be identified using different dimensions according to different methods.

A multi-view scalable bitstream includes sub-streams of different views within a single bitstream. For example, a bitstream of a stereoscopic image includes a left image and a right image. A scalable bitstream may include sub-streams regarding a multi-view image and encoded data of a depth map. View scalabilities may be identified using different dimensions according to views.

Different scalability extension types may be coupled with each other. In other words, a scalable video bitstream may include sub-streams obtained by encoding multi-layer image sequences in which images are different in at least one of temporal scalability, spatial scalability, quality scalability, and multi-view scalability.

FIG. 2 illustrates image sequences 31, 32, and 33 having different scalability extension types. The image sequence 31 corresponds to a first layer, the image sequence 32 corresponds to a second layer, and the image sequence 33 corresponds to an n-th layer (where n denotes an integer). The image sequences 31, 32, and 33 may be different in at least one of a resolution, a quality, and a view. An image sequence of one layer among the image sequence 31 of the first layer, the image sequence 32 of the second layer, and the image sequence 33 of the n-th layer may be an image sequence of a base layer, and image sequences of the other layers may be image sequences of enhancement layers.

For example, the image sequence 31 of the first layer may be images of a first view, the image sequence 32 of the second layer may be images of a second view, and the image sequence 33 of the n-th layer may be images of an n-th view. As another example, the image sequence 31 of the first layer may be left-view images of a base layer, the image sequence 32 of the second layer may be right-view images of the base layer, and the image sequence 33 of the n-th layer may be right-view images of an enhancement layer. The image sequences 31, 32, and 33 having different scalability extension types are not limited thereto, and the image sequences 31, 32, and 33 may be image sequences having different image attributes.

Figure 4:
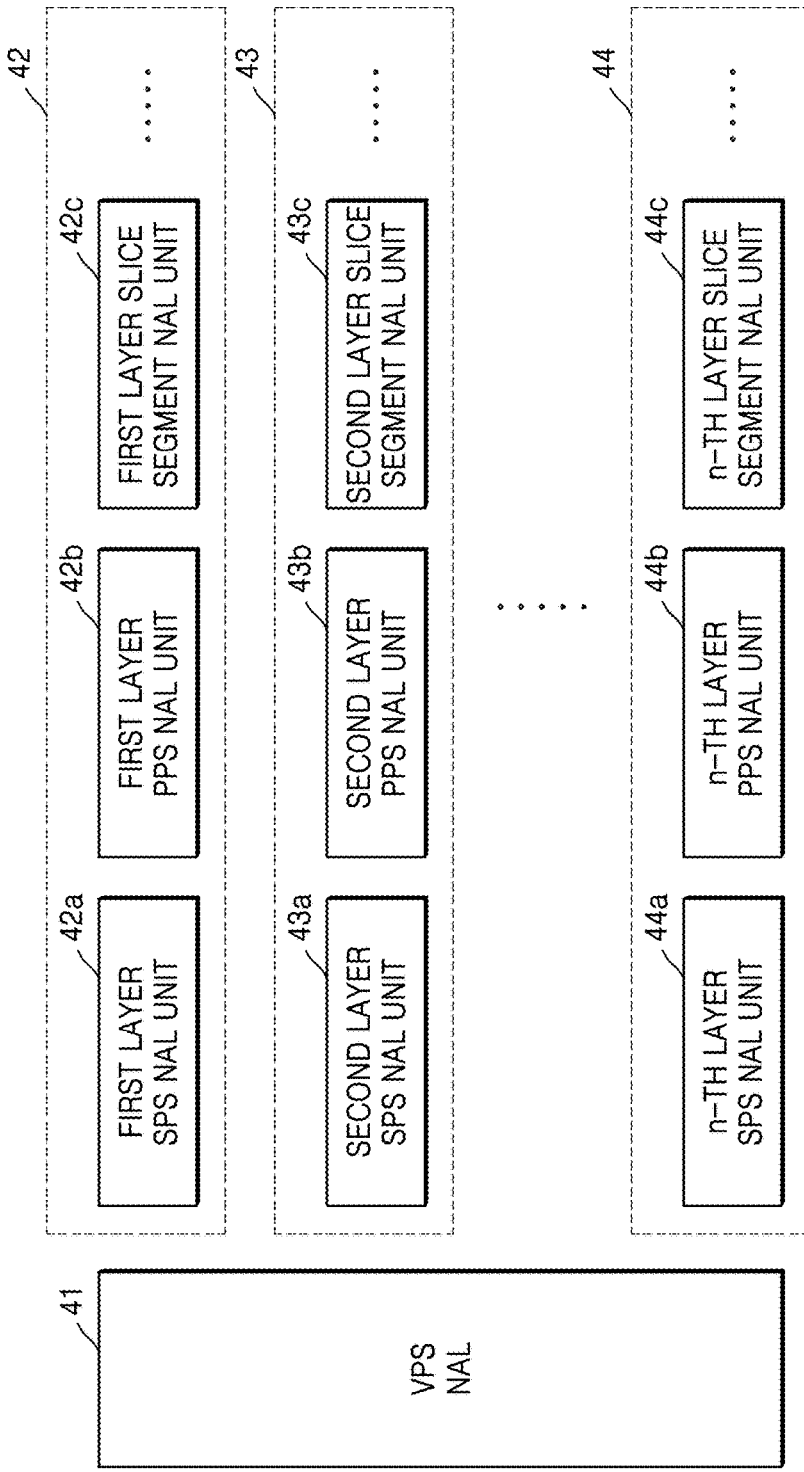
FIG. 4 illustrates network abstract layer (NAL) units including encoded data of a multi-layer video according to an embodiment of the present invention.

FIG. 4 illustrates NAL units including encoded data of a multi-layer video according to an embodiment of the present invention.

As described above, the bitstream generator 12 outputs the NAL units including the encoded multi-layer video data and additional information. A VPS includes information that is applied to multi-layer image sequences 42, 43, and 44 included in a multi-layer video. An NAL unit including information about a VPS is referred to as a VPS NAL unit 41.

The VPS NAL unit 41 includes, for example, a common syntax element shared by the multi-layer image sequences 42, 43, and 44, information about an operation point to prevent transmission of unnecessary information, and necessary information about an operation point necessary for a session negotiation stage, such as a profile or a level. In particular, the VPS NAL unit 41 according to an embodiment includes scalability information related with a scalability ID for accomplishing scalability in the multi-layer video. The scalability information is used to determine scalability that is applied to the multi-layer image sequences 42, 43, and 44 included in the multi-layer video.

The scalability information includes information regarding a scalability type and a scalability dimension that are applied to the multi-layer image sequences 42, 43, and 44 included in the multi-layer video. In an encoding/decoding method according to a first embodiment of the present invention, the scalability information may be obtained directly from the value of a layer ID included in a NAL unit header. The layer ID is included in a VPS and used to distinguish a plurality of layers from one another. The VPS may signal the layer ID of each layer via a VPS extension. The layer ID of each layer of the VPS may be included in a VPS NAL unit and then signaled. For example, a layer ID of NAL units that belong to a specific layer of the VPS may be included in a VPS NAL unit. For example, the layer ID of NAL units that belong to the VPS may be signaled via a VPS extension. Thus, in an encoding/decoding method according to an embodiment of the present invention, scalability information about a layer of NAL units belonging to a VPS may be obtained using a layer ID of the NAL units.

Figure 5A:
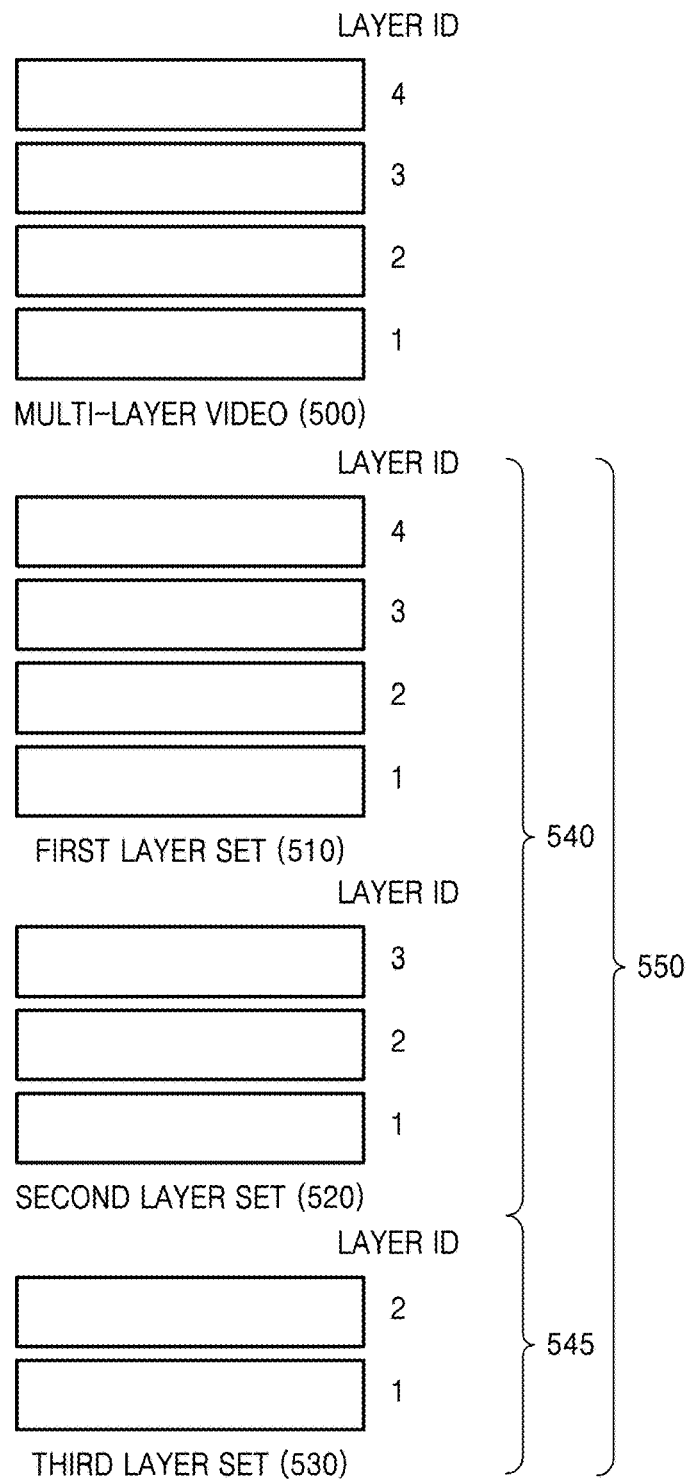
FIG. 5A is a drawing to explain an output layer set according to an embodiment of the present invention.

FIG. 5A is a drawing to explain an output layer set according to an embodiment of the present invention.

The multi-layer video decoding apparatus 20 may determine a layer set including at least one layer from a multi-layer video. In this case, several layer sets may be determined.

According to the present embodiment, it is assumed that a layer having a smallest layer ID value is a base layer. A layer having a large layer ID value is an enhancement layer, and may be a layer that is decoded by referring to a result of decoding the other layers.

It is assumed that an encoded multi-layer video 500 according to an embodiment of the present invention includes 4 layers. Each layer has different layer IDs. In this case, the multi-layer video 500 may have three layer sets as follows.

A first layer set 510 may include all of the layers included in the multi-layer video 500.

A second layer set 520 may include three of the layers included in the multi-layer video 500.

A layer set group 540 may include at least one layer set. For example, the layer set group 540 may include the first layer set 510 and the second layer set 520.

A third layer set 530 may include two of the layers included in the multi-layer video 500.

An additional layer set group 545 may include at least one additional layer set. For example, the additional layer set group 545 may include the third layer set 530, which is an additional layer set.

An output layer set group 550 may include at least one layer set group. For example, the output layer set group 550 may include the layer set group 540 and the additional layer set group 545.

A layer set included in the output layer set group 550 is referred to as an output layer set. For example, the output layer set group 550 may include output layer sets, such as the first layer set 510, the second layer set 520, and the third layer set 530.

The multi-layer video decoding apparatus 20 may determine one output layer set among the output layer set group 500. An output layer set determined in this way is referred to as a target output layer set. The multi-layer video decoding apparatus 20 may decode layers included in the target output layer set by determining the determined target output layer set as a target decoding layer set.

The multi-layer video decoding apparatus 20 is not limited to determining three layer sets as in FIG. 5A, and layer sets may be determined by combining decodable layers.

The multi-layer video encoding apparatus 10 may determine an output layer set group and then generate information representing the number of output layer sets included in the output layer set group and generate a bitstream including the generated information representing the number of output layer sets.

The multi-layer video decoding apparatus 20 may obtain the generated bitstream, obtain information about the number of output layer sets from the obtained bitstream, and determine the output layer set by using the obtained information.

The multi-layer video encoding apparatus 10 may determine the target output layer set among the output layer set group and generate the multi-layer video bitstream including layers included in the determined target output layer set.

The multi-layer video decoding apparatus 20 may determine the output layer set group, based on the information about the number of output layer sets from the multi-layer video bitstream. At this time, the multi-layer video decoding apparatus 20 may previously determine the target output layer set that is decoded, from among the determined output layer set group.

For example, before receiving the bitstream, the multi-layer video decoding apparatus 20 may determine the first layer set 510 among the first, second, and third layer sets 510, 520, and 530, as the target output layer set that is decoded.

However, embodiments of the present invention are not limited thereto, and, when the multi-layer video encoding apparatus 10 determines the target output layer set among the output layer set group, the multi-layer video encoding apparatus 10 generates an index representing the target output layer set among the output layer set group. The multi-layer video decoding apparatus 20 obtains the generated bitstream. The multi-layer video decoding apparatus 20 may obtain the index representing the target output layer set from the obtained bitstream, determine the target output layer set among the output layer set group by using the obtained index, and decode layers included in the target output layer set.

The multi-layer video decoding apparatus 20 may determine the output layer set group based on information about the number of output layer sets. When the multi-layer video decoding apparatus 20 determines the first layer set 510, which is the target output layer set, among the determined output layer set group, the multi-layer video decoding apparatus 20 may determine whether the layers included in the multi-layer video bitstream have all of the layers included in the first layer set 510.

When the multi-layer video decoding apparatus 20 determines that the layers included in the multi-layer video bitstream have all of the layers included in the first layer set 510, the multi-layer video decoding apparatus 20 may decode an image including the layers included in the first layer set 510.

In detail, the number of layer sets NumLayerSets may be determined based on a syntax element vps_num_layer_sets_ minus1 representing "number of layer sets obtained from bitstream" minus 1, and an additional element num_add_layer_set representing the number of additional layer sets. The number of output layer sets NumOutputLayerSets may be determined based on an additional output layer set num_add_olss obtained from the bitstream.

Figure 5B:
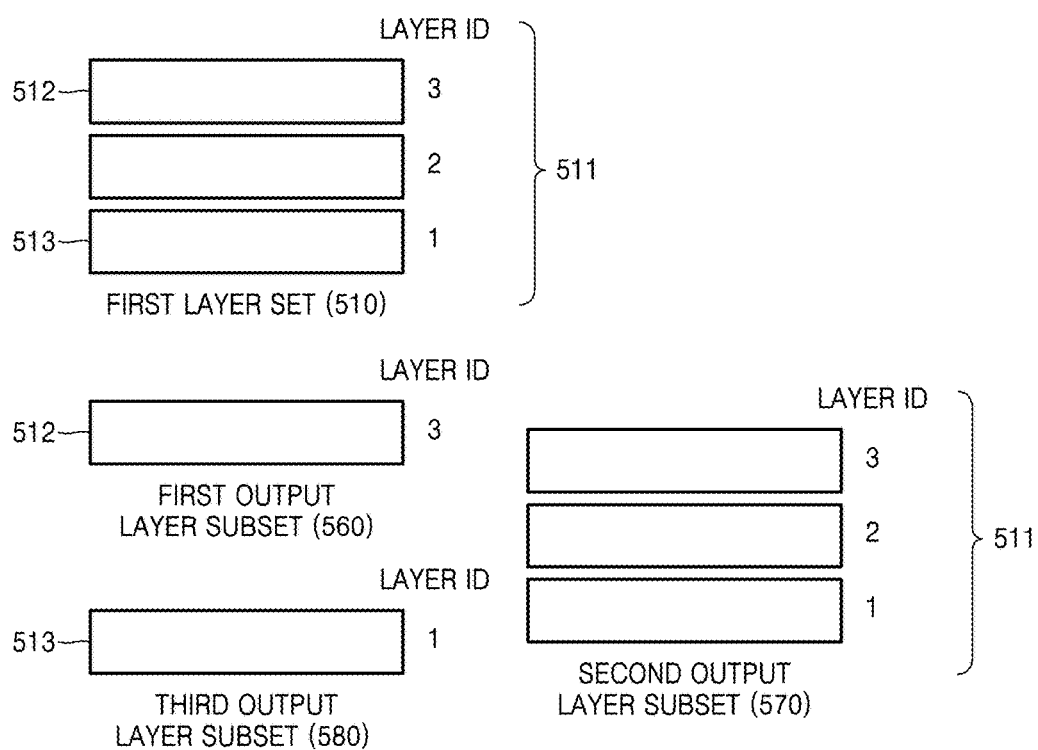
FIG. 5B is a drawing to explain an output layer subset according to an embodiment of the present invention.

FIG. 5B is for explaining an output layer subset according to an embodiment of the present invention.

Referring to FIG. 5B, it is assumed that the multi-layer video decoding apparatus 20 determined the first layer set 510 of FIG. 5A as the target output layer set.

The multi-layer video decoding apparatus 20 may decode at least one of layers 511 included in the first output layer set 510. However, the multi-layer video decoding apparatus 20 may display at least one of the decoded layers instead of displaying all of the decoded layers.

The multi-layer video decoding apparatus 20 may determine an output layer among the layers included in the first output layer set 510. In detail, the multi-layer video decoding apparatus 20 may determine an output layer subset including an output layer from among the layers included in the first output layer set 510.

For example, a first output layer subset 560 according to an embodiment may include only a layer 512 having a largest layer ID value from among the layers included in the first layer set 510. When a multi-layer video has a spatial scalability type, a layer having a smallest layer ID value is a layer having a low resolution, and a layer having a largest layer ID value is a layer having a high resolution. A layer having a high resolution refers to a layer having a low resolution. Accordingly, when a layer having a high resolution is decoded, since a layer having a low resolution includes the same information as the layer having a high resolution, the layer having a low resolution does not need to be displayed. Thus, the layer 512 having the largest layer ID value may be included in a first output layer subset 560.

For example, a second output layer subset 570 according to another embodiment may include all of the layers 511 included in the first layer set 510. When a multi-layer video has a multi-view scalability type, the multi-layer video may include layers respectively representing a left view, a right view, and a center view. The layers included in a layer set respectively represent a left view, a right view, and a center view, and thus all of the layers may be displayed.

A third output layer subset 580 may include a layer 513 having a smallest layer ID value from among the layers included in the first layer set 510.

The multi-layer video decoding apparatus 20 may obtain an index representing an output layer subset and may determine one of the output layer subsets 540, 550, and 560 by using the obtained index.

The multi-layer video decoding apparatus 20 decodes the layers included in the determined target output layer subset and then display the decoded layers.

As described above with reference to FIGS. 5A and 5B, it is assumed that a layer having a smallest layer ID value is a base layer and a layer having a largest layer ID value is a layer that may be decoded and encoded last from among enhancement layers. However, embodiments of the present invention are not limited thereto, and a layer having a high layer ID value may be independently encoded without referring to a layer having a smaller layer ID value than the layer having the high layer ID value.

Although the layers shown in FIGS. 5A and 5B are assumed to represent primary images, embodiments of the present invention are not limited thereto, and the layers may include layers representing auxiliary images. For example, an alpha plane image and a depth image may be included as the auxiliary images. These auxiliary images are merely images referred to decode a primary image, and are not images that are directly output and displayed.

Accordingly, the multi-layer video decoding apparatus 20 may determine layers except for a layer representing an auxiliary image, as an output layer subset.

Although the embodiment of FIG. 5BA has been described above on the premise that the second layer set 510 is determined as a target output layer set, embodiments of the present invention are not limited thereto, and the multi-layer video decoding apparatus 20 may determine only an output layer set group and then may determine the target output layer set without determining the target output layer set in advance. In this case, the multi-layer video decoding apparatus 20 may determine an output layer subset for each of the first, second, and third layer sets 510, 520, and 530.

For example, the multi-layer video decoding apparatus 20 may determine an output layer set group including the layer sets 510, 520, and 530, may determine a layer having a largest layer ID value of each of the layer sets 510, 520, and 530, namely, a number-4 layer having a largest layer ID value in the case of the first layer set 510, a number-3 layer having a largest layer ID value in the case of the second layer set 520, and a number-2 layer having a largest layer ID value in the case of the third layer set 530, as an output layer subset, and may determine an output layer subset group including the output layer subsets. At this time, the multi-layer video decoding apparatus 20 may determine an output layer subset group, based on the index representing the output layer subset group.

When the target output layer set is set, the multi-layer video decoding apparatus 20 may determine one target output layer subset among the output layer subset group. In other words, a target output layer subset including at least one layer included in the target output layer set may be determined.

For example, when the multi-layer video decoding apparatus 20 determines the first layer set 510 among the output layer set group as the target output layer set, the multi-layer video decoding apparatus 20 may determine the first output layer subset 560 among the output layer subset group and may decode a layer 513 having a largest layer ID value included in the first output layer subset 560.

FIGS. 6A and 6B illustrate a VPS extension syntax according to an embodiment of the present invention.

Referring to a syntax region 610 according to an embodiment of the present invention of FIG. 6A, when the number of layers included in a multi-layer is greater than 1 (if (NumViews>1), the multi-layer video decoding apparatus 20 obtains view_id_len_minus1 representing a length of view_id_val, and obtains a view ID view_id_val[i] of an i-th view by repeating an i value from 0 to NumView−1 (for (i=0;i<NumViews;i++)). When NumView is 1 (the i value is 0), view_id_len_minus1 representing the length of view_id_val is not obtained, and thus the length of view_id_val is not determined. Thus, when i is 0 (when NumView is 1), view_id_val[0] may not be obtained. When NumView is 1, the number of views is one, and thus one view ID may exist, and view_id_val[0] may not need to be obtained.

The multi-layer video decoding apparatus 20 according to another embodiment of the present invention replaces an initial variable I of for sentence with 1 (for(i=1; i<NumViews;i++). When a range to which if sentence (if(NumViews>1) is applied includes for sentence and thus NumView is 1, the multi-layer video decoding apparatus 20 does not perform the for sentence.

Accordingly, the multi-layer video decoding apparatus 20 perform a for sentence work only when NumView is greater than 1 (when an i value is greater than 0). Consequently, a problem in which view_id_val[0] cannot be obtained may be addressed.

The multi-layer video decoding apparatus 20 according to an embodiment of the present invention obtains a syntax element profile_ref_minus1[i] 620. The syntax element profile_ref_minus1[i] 620 represents that a syntax structure of profile_tier_level( ) of an i-th layer set is equally induced by profile and tier information about a profile_ref_minus1[i]+1-th layer set.

In the case of a first layer set (when an i value is 1), even when there is no profile and tier information to which the first layer set is to refer, a minimum value of profile_ref_minus1[0] becomes 0, which is. However, a syntax structure of profile_tier_level( ) of the first layer set is equally induced by referring to profile and tier information about a (profile_ref_minus1[0] (0)+1)th layer set. Accordingly, the multi-layer video decoding apparatus 20 has a collision since the syntax structure of profile_tier_level( ) of the first layer set should be equally induced by profile and tier information about the first layer set. Although a restriction condition that profile_ref_minus1[i]+1 should be less than i exists as a condition of a current syntax element profile_ref_minus1[i] 620, when i is 1, this condition is not satisfied.

The multi-layer video decoding apparatus 20 according to another embodiment of the present invention replaces the syntax element profile_ref_minus1[i] 620 with a syntax element profile_ref[i] and obtain the syntax element profile_ref[i]. Thus, the problem generated when i is 1 may be addressed. The syntax element profile_ref[i] represents that an i-th syntax structure of profile_tier_level( ) is equally induced from profile and tier information about a profile_ref[i]-th layer set.

The multi-layer video decoding apparatus 20 according to an embodiment of the present invention obtains a syntax element default_one_target_output_layer_flag 630. The syntax element default_one_target_output_layer_flag 630 is a flag representing whether one target output layer is set.

When the syntax element default_one_target_output_layer_flag 630 is 1, the multi-layer video decoding apparatus 20 sets one output target layer from each of output layer sets (OLEs). When the syntax element default_one_target_output_layer_flag 630 is 0, the multi-layer video decoding apparatus 20 includes no output target layers and thus sets all of the layers included in each OLE as a target output layer.

When one or all of the layers included in an output layer set is set as a target output layer, the multi-layer video decoding apparatus 20 according to an embodiment of the present invention cannot set an output layer set by using flags representing 0 and 1.

Thus, the multi-layer video decoding apparatus 20 according to an embodiment of the present invention may replace the flag default_one_target_output_layer_flag 630 with an index default_output_layer_idx. In this case, the index may represent three or more output layer subset groups each including an output layer of each output layer set.

For example, a predetermined first value in the index may represent an output layer subset group in which all of the layers included in each output layer set are output layers.

A predetermined second value in the index may represent an output layer subset group in which only a layer having a largest layer ID value included in each output layer set is an output layer.

A predetermined third value in the index may represent an output layer subset group in which only a layer having a smallest layer ID value included in each output layer set is an output layer.

Each output layer set may include not only a layer representing a primary image but also a layer representing an auxiliary image. In this case, a predetermined fourth value in the index may represent an output layer subset group in which layers except for the layer representing the auxiliary image from each output layer set are output layers.

Each output layer set may include a layer representing a depth image. In this case, a predetermined fifth value in the index may represent an output layer subset group in which only layers except for the layer representing the depth image from each output layer set are output layers.

Each output layer set may include layers representing various types of images, such as, a depth image, an auxiliary image, and a primary image. In this case, a predetermined sixth value in the index may represent an output layer subset group in which all of the layers corresponding to images having largest capacities, namely, primary images, are output layers.

A predetermined seventh value in the index may represent a case where it is difficult to determine an output layer according to a consistent criterion for each output layer set, and an output layer subset group is individually determined according to each output layer set.

In this case, a flag representing whether each layer included in each output layer set is an output layer may be additionally obtained, and thus an output layer may be determined.

The multi-layer video decoding apparatus 20 according to another embodiment of the present invention may not obtain the syntax element default_one_target_output_layer_flag 630.

The multi-layer video decoding apparatus 20 according to an embodiment of the present invention may induce the value of default_one_target_output_layer_flag by using other previously-obtained syntax elements. In other words, since the syntax element default_one_target_output_layer_flag 630 may be induced from an allowed scalability type and the number of allowed scalabilities, signaling for a separate output layer is not necessary.

If NumScabilityTypes representing the number of allowed scalabilities is 1 and scalability_mask_flag[1] representing a multi-view scalability type is 1, the allowed scalability type is only a multi-view scalability type. In this case, information representing that an output layer subset group includes all of the layers included in each output layer set may be induced.

If NumScabilityTypes is 1 and scalability_mask_flag[2] representing a spatial/quality scalability type is 1, the allowed scalability type is only a spatial/quality multi-view scalability type. In this case, information representing that an output layer subset group includes a layer having a largest layer ID value from among the layers included in each output layer set may be induced.

When different allowed scalability types are included, an output layer subset group may include all or one of the layers included in an output layer set, and this may be induced.

If the output layer set includes one or more allowed scalability type, the output layer set may be pre-defined. For example, when multi-view and spatial/quality scalability types exist in a multi-layer set, information representing that an output subset group includes all layers having highest DependencyID values may be induced. Herein, DependencyID represents a scalability ID ScalabilityId of a spatial/quality scalability dimension.

Referring to a syntax region 640, the multi-layer video decoding apparatus 20 according to an embodiment of the present invention obtains a flag rep_format_idx_present_flag representing whether an index representing an expression format of a layer exists.

If an index representing an expression format of a layer exists (if(rep_format_present_flag)), the multi-layer video decoding apparatus 20 according to an embodiment of the present invention obtains information vps_num_rep_formats_minus1 representing the number of expression formats of a layer, and repeats a syntax structure rep_format( ) from when an i value is 0 to when the i value is the number of expression formats of a layer (for(i=0; i<=vps_num_rep_formats_minus1;i++)). If the index representing an expression format of a layer exists (if(rep_format_present_flag)), when the number of expression formats of a layer is greater than (vps_num_rep_formats_minus1>0), the multi-layer video decoding apparatus 20 according to an embodiment of the present invention obtains an index vps_rep_format_idx[i] of the expression formats of a layer repeatedly from when the i value is 0 to when the i value is the number of expression formats of a layer (for (i=0;i<=vps_num_rep_formats_minus1;i++)). However, according to the above-described embodiment, even when all layers share a common expression format (i.e., layers are expressed in one format), the syntax region 640 is always performed.

Referring to FIG. 6B, the multi-layer video decoding apparatus 20 according to an embodiment of the present invention obtains sing_rep_format_flag 651. If the value of the single_rep_format_flag 651 is 0 (if(!single_ref_format_flag)), a syntax region 650 replaces the syntax region 640 and is performed (i.e., detailed information about an expression format is obtained). On the other hand, when the value of single_rep_format_flag 651 is 1, the syntax region 650 is not performed. Accordingly, when a common expression format is shared by all layers, an unnecessary obtaining operation may not be performed. In addition, the multi-layer video decoding apparatus 20 according to an embodiment of the present invention replaces a syntax element vps_num_rep_formats_minus_1 with vps_max_layers_minus_2.

vps_num_rep_formats_minus_2 represents a subtraction of 2 from the number of expression formats of a layer.

The multi-layer video decoding apparatus 20 according to an embodiment of the present invention obtains a syntax element Cross_layer_irap_aligned_flag 660 representing whether cross-layer IRAP is allocated.

The syntax element Cross_layer_irap_aligned_flag 660 depends on a scalability type, and this may be induced from a syntax element scalability_mask_flag. Allocation of cross-layer RAP is requested for multi-view scalability, but is not essential for spatial scalability.

Accordingly, the syntax element Cross_layer_irap_aligned_flag is 1 when scalability_mask_flag[i] is 1 and NumScalabilityTypes is 1 (i.e., in the case of multi-view scalability), and may be 0 in the case of spatial scalability. CrossLayerIrapAlignedFlag may store the induced value.

The multi-layer video decoding apparatus 20 according to an embodiment of the present invention does not obtain a syntax element single_layer_for_non_irap_flag 670, because the syntax element single_layer_for_non_irap_flag 670 is no longer used. Accordingly, 1 bit of a bitstream for single_layer_for_non_irap_flag is not wasted. The multi-layer video decoding apparatus 20 may not perform an unnecessary obtaining operation.

Referring to a syntax region 680, the multi-layer video decoding apparatus 20 according to an embodiment of the present invention obtains a syntax element vps_vui_present_flag 680 representing whether a syntax structure vps_vui( ) exists, and obtains an syntax element vps_vui_offset representing an offset of the syntax structure vps_vui( ) when vps_vui_present_flag is 1 (if(vps_vui_present_flag)). Thus, when the syntax structure vps_vui( ) does not exist (vps_vui_present_flag=0), 16 bits for offset may not be wasted.

Hereinafter, an inter-layer prediction that may be performed by the image encoder 11 of the video stream encoding apparatus 10 according to various embodiments will be described with reference to FIG. 7.

Figure 7:
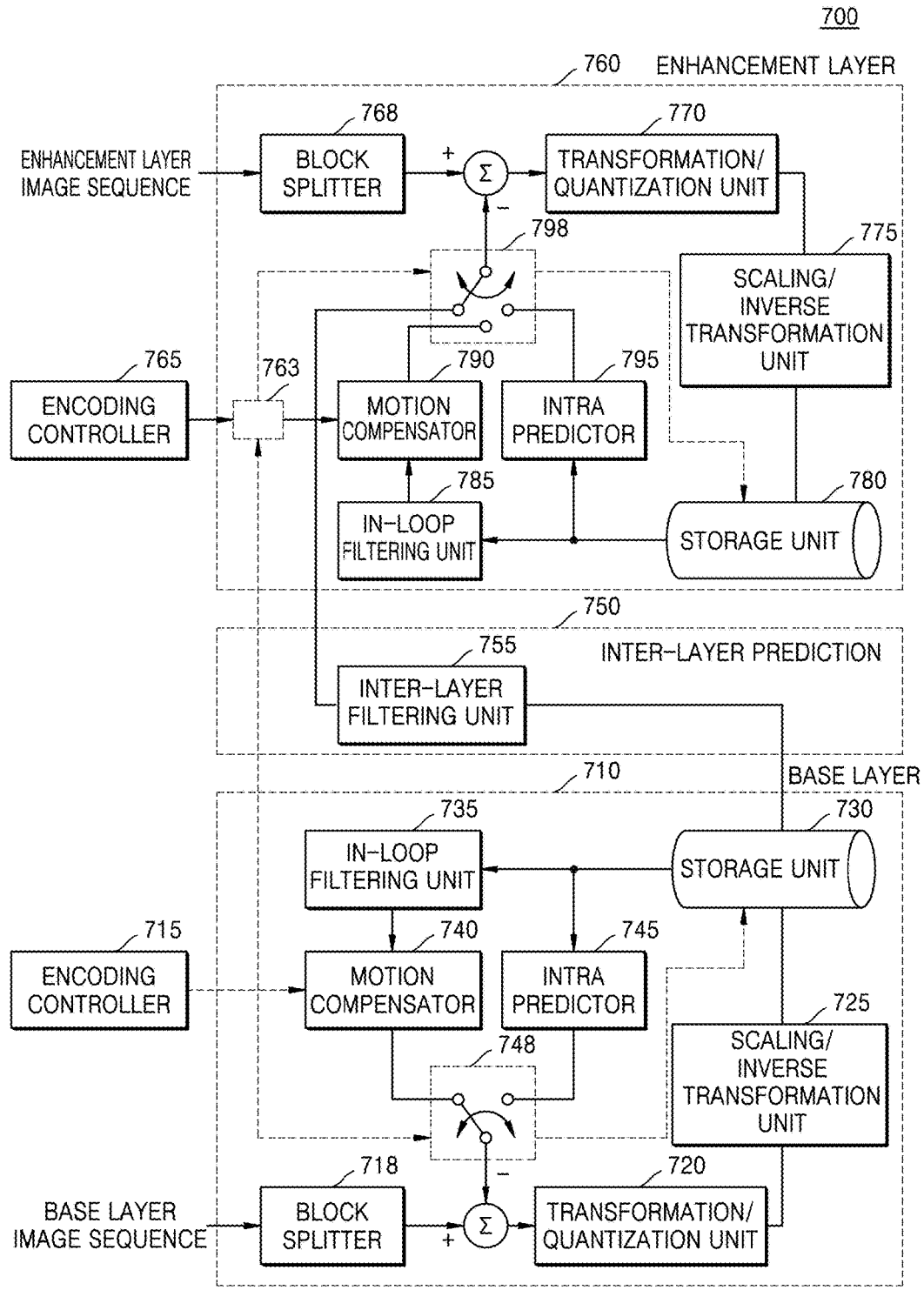
FIG. 7 illustrates an inter-layer prediction structure according to an embodiment.

FIG. 7 illustrates an inter-layer prediction structure according to an embodiment.

An inter-layer encoding system 700 includes a base layer encoder 710, an enhancement layer encoder 760, and an inter-layer predictor 750 between the base layer encoder 710 and the enhancement layer encoder 760. The base layer encoder 710 and the enhancement layer encoder 760 may be included in the image encoder 11.

The base layer encoder 710 receives and encodes a base layer image sequence according to images. The enhancement layer encoder 760 receives and encodes an enhancement layer image sequence according to images. Overlapping operations of the base layer encoder 710 and the enhancement layer encoder 760 will be simultaneously described later.

An input image (a low resolution image or a high resolution image) is split into a largest coding unit, a coding unit, a prediction unit, or a transformation unit through a block splitter 718 or 768. In order to encode a coding unit output from the block splitter 718 or 768, intra prediction or inter prediction may be preformed according to prediction units of the coding unit. A prediction switch 748 or 798 may enable inter prediction to be performed by referencing a pre-reconstructed image output from a motion compensator 740 or 790 or intra prediction to be performed by using a neighboring prediction unit of a current prediction unit in a current input image output from an intra predictor 745 or 795, based on whether a prediction mode of a prediction unit is an intra prediction mode or an inter prediction mode.

Residual information may be generated according to prediction units via inter prediction.

Residual information between a prediction unit and an adjacent image is input to a transformation/quantization unit 720 or 770 according to prediction units of a coding unit. The transformation/quantization unit 720 or 770 may output a quantized transformation coefficient by performing transformation and quantization according to transformation units, based on a transformation unit of a coding unit.

A scaling/inverse transformation unit 725 or 775 may generate residual information of a spatial domain by again performing scaling and inverse transformation on the quantized transformation coefficient according to transformation units of a coding unit. When the prediction switch 748 or 798 is controlled to point at an inter mode, a reconstructed image including a current prediction unit may be generated as the residual information is composed with a pre-reconstructed image or a neighboring prediction unit, and the reconstructed image may be stored in a storage unit 730 or 780. The reconstructed image may be transmitted to the intra predictor 745 or 795 or the motion compensator 740 or 790 according to a prediction mode of a prediction unit that is encoded next.

In particular, in an inter mode, an in-loop filtering unit 735 or 785 may perform, on a reconstructed image stored in the storage unit 730 or 780, at least one of deblocking filtering and sample adaptive offset (SAO) filtering according to coding units. At least one of deblocking filtering and SAO filtering may be performed on a coding unit and at least one of a prediction unit and a transformation unit included in the coding unit.

Deblocking filtering is filtering for easing a blocking phenomenon of a data unit, and SAO filtering is filtering for compensating for a pixel value that is transformed according to data encoding and decoding. Data filtered by the in-loop filtering unit 735 or 785 may be transmitted to the motion compensator 740 or 790 according to prediction units. Then, in order to encode a following coding unit output from the block splitter 718 or 768, residual information between a current reconstructed image and a following coding unit output from the motion compensator 740 or 790 and the block splitter 718 or 768 may be generated.

As such, the above encoding operation may be repeated according to coding units of an input image.

Also, for inter-layer prediction, the enhancement layer encoder 760 may reference a reconstructed image stored in the storage unit 730 of the base layer encoder 710. An encoding controller 715 of the base layer encoder 710 may control the storage unit 730 of the base layer encoder 710 to transmit a reconstructed image of the base layer encoder 710 to the enhancement layer encoder 760. In the inter-layer predictor 750, an inter-layer filtering unit 755 may perform deblocking filtering or SAO filtering on a base layer reconstructed image output from the storage unit 730 of the base layer encoder 710. When resolution of a base layer image and resolution of an enhancement layer image are different from each other, the inter-layer predictor 750 may up-sample the base layer reconstructed image before transmitting the base layer reconstructed image to the enhancement layer encoder 760. When inter-layer prediction is performed according to control of the prediction switch 798 of the enhancement layer encoder 760, inter-layer prediction may be performed on an enhancement layer image by referencing the base layer reconstructed image transmitted through the inter-layer predictor 750.

In order to encode an image, various encoding modes may be set for a coding unit, a prediction unit, and a transformation unit. For example, a depth or split information (split flag) may be set as an encoding mode of a coding unit. A prediction mode, a partition type, intra direction information, or reference list information may be set as an encoding mode of a prediction unit. A transformation depth or split information may be set as an encoding mode of a transformation unit.

The base layer encoder 710 may determine an encoding depth, a prediction mode, a partition type, an intra direction/reference list, and a transformation depth, which have highest encoding efficiency, based on results of performing encoding by applying various depths for a coding unit, various prediction modes, various partition types, various intra directions, and various reference lists for a prediction unit, and various transformation depths for a transformation unit. The encoding mode determined by the base layer encoder 710 is not limited thereto.

The encoding controller 715 of the base layer encoder 710 may control each component such that one of various encoding modes is suitably applied to an operation of the component. Also, the encoding controller 715 may control the enhancement layer encoder 760 to determine an encoding mode or residual information by referencing an encoding result of the base layer encoder 710, for inter-layer encoding of the enhancement layer encoder 760.

For example, the enhancement layer encoder 760 may use an encoding mode of the base layer encoder 710 as an encoding mode for an enhancement layer image, or may determine an encoding mode for an enhancement layer image by referencing an encoding mode of the base layer encoder 710. The encoding controller 715 of the base layer encoder 710 may control a control signal of an encoding controller 765 of the enhancement layer encoder 760 to use a current encoding mode of the base layer encoder 710 in order to determine a current encoding mode of the enhancement layer encoder 760.

An inter-layer decoding system according to an inter-layer prediction method may be realized similarly to the inter-layer encoding system 700 of FIG. 7 according to the inter-layer prediction method. In other words, the inter-layer decoding system of a multi-layer video may receive a base layer bitstream and an enhancement layer bitstream. A base layer decoder of the inter-layer decoding system may reconstruct base layer images by decoding the base layer bitstream. An enhancement layer decoder of the inter-layer decoding system may reconstruct enhancement layer images by decoding the enhancement layer bitstream by using a base layer reconstructed image and parsed encoding information.

When the image encoder 11 of the multi-layer video encoding apparatus 10 according to various embodiments performed inter-layer prediction, the image decoder 22 of the multi-layer video decoding apparatus 20 may reconstruct multi-layer images according to the above-described inter-layer decoding system.

The multi-layer video encoding apparatus 10 of FIG. 1A may generate samples by performing intra prediction, inter prediction, inter-layer prediction, transformation, and quantization according to image blocks, and output a bitstream by performing entropy-encoding on the samples. In order to output a video encoding result, i.e., a base layer video stream and an enhancement layer video stream, the multi-layer video encoding apparatus 10 according to an embodiment may operate in cooperation with an internal video encoding processor installed therein or an external video encoding processor so as to perform video encoding operations including transformation and quantization. The internal video encoding processor of the multi-layer video encoding apparatus 10 according to an embodiment may be a separate processor, or alternatively, a video encoding apparatus, a central processing apparatus, or a graphic processing apparatus may include a video encoding processing module to perform the basic video encoding operations.

Also, the multi-layer video decoding apparatus 20 of FIG. 2A decodes a received base layer video stream and a received enhancement layer video stream. In other words, inverse quantization, inverse transformation, intra prediction, and motion compensation (inter-motion compensation and inter-layer disparity compensation) are performed according to image blocks with respect to the base layer video stream and the enhancement layer video stream to reconstruct samples of base layer images from the base layer video stream and samples of enhancement layer images from the enhancement layer video stream. In order to output a reconstructed image generated as a decoding result, the multi-layer video decoding apparatus 20 according to an embodiment may operate in cooperation with an internal video decoding processor installed therein or an external video decoding processor so as to perform video reconstruction operations including inverse quantization, inverse transformation, and prediction/compensation. The internal video decoding processor of the multi-layer video decoding apparatus 20 according to an embodiment may be a separate processor, or alternatively, a video decoding apparatus, a central processing apparatus, or a graphic processing apparatus may include a video decoding processing module to perform the basic video reconstruction operations.

In the multi-layer video encoding apparatus 10 according to an embodiment and the multi-layer video decoding apparatus 20 according to an embodiment, as described above, video data may be split into coding units having a tree structure, and coding units, prediction units, and transformation units are used for inter layer prediction or inter prediction on the coding units. Hereinafter, a video encoding method and apparatus and a video decoding method and apparatus based on coding units and transformation units having a tree structure according to an embodiment will be described with reference to FIGS. 8-20.

In principle, during encoding/decoding for multi-layer video, encoding/decoding processes for base layer images and encoding/decoding processes for enhancement layer images are separately performed. In other words, when inter-layer prediction is performed on a multi-layer video, encoding/decoding results of a single-layer video are referred to each other, but separate encoding/decoding processes are performed for respective single-layer videos.

For convenience of description, since a video encoding process and a video decoding process based on a coding unit of a tree structure, which will be described later with reference to FIGS. 8-20, are performed on a single-layer video, inter prediction and motion compensation will be described. However, as described with reference to FIGS. 1A-7, inter-layer prediction and compensation between base view images and enhancement layer images are performed to encode/decode a video stream.

Figure 8:
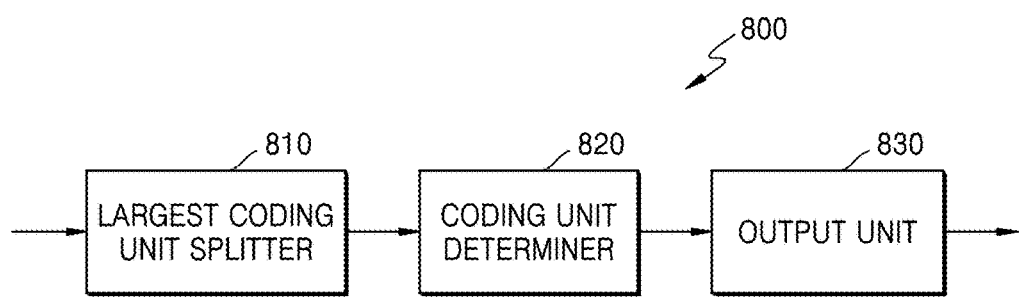
FIG. 8 is a block diagram of a video encoding apparatus according to various embodiments based on coding units having a tree structure.

Accordingly, in order for the image encoder 11 of the multi-layer video encoding apparatus 10 according to an embodiment to encode a multi-layer video based on coding units having a tree structure, the multi-layer video encoding apparatus 10 may include as many video encoding apparatuses 800 of FIG. 8 as the number of layers of the multi-layer video so as to perform video encoding according to each single-layer video, thereby controlling each video encoding apparatus 800 to encode an assigned single-layer video.

Also, the multi-layer video encoding apparatus 10 may perform inter-view prediction by using an encoding result of individual single views of each video encoding apparatus 800. Accordingly, the image encoder 11 of the multi-layer video encoding apparatus 10 may generate a base view video stream and an enhancement layer video stream, which include encoding results according to layers.

Figure 9:
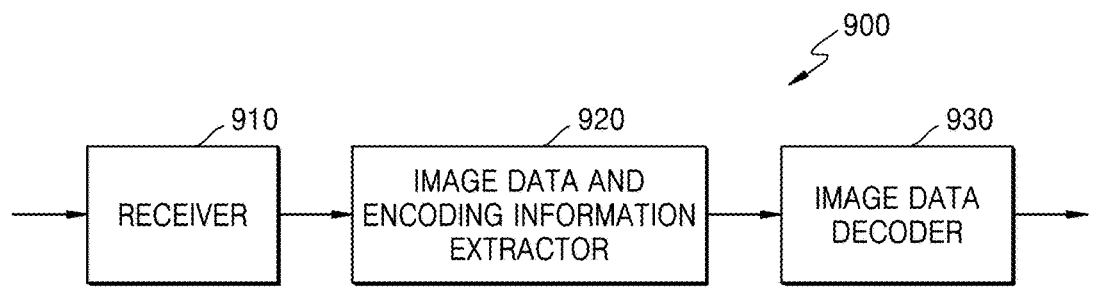
FIG. 9 is a block diagram of a video decoding apparatus according to various embodiments based on coding units having a tree structure.

Similarly, in order for the image decoder 22 of the multi-layer video decoding apparatus 20 according to an embodiment to decode a multi-layer video based on coding units having a tree structure, the multi-layer video decoding apparatus 20 may include as many video decoding apparatuses 900 of FIG. 9 as the number of layers of the multi-layer video so as to perform video decoding according to layers with respect to a received base layer video stream and a received enhancement layer video stream, thereby controlling each video decoding apparatus 900 to decode an assigned single-layer video. Also, the multi-layer video decoding apparatus 20 may perform inter-layer compensation by using a decoding result of individual single layer of each video decoding apparatus 900. Accordingly, the image decoder 22 of the multi-layer video decoding apparatus 20 may generate base layer images and enhancement layer images, which are reconstructed according to layers.

FIG. 8 is a block diagram of a video encoding apparatus according to an embodiment based on coding units having a tree structure 800.

The video encoding apparatus according to an embodiment involving video prediction based on coding units according to a tree structure 800 includes a coding unit determiner 820 and an output unit 830. For convenience of explanation, the video encoding apparatus according to an embodiment involving video prediction based on coding units according to a tree structure 800 will be abbreviated to the 'video encoding apparatus 800'.

The coding unit splitter 820 may split a current picture based on a largest coding unit that is a coding unit having a maximum size for a current picture of an image. If the current picture is larger than the largest coding unit, image data of the current picture may be split into at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit. As the depth deepens, deeper coding units according to depths may be split from the largest coding unit to a smallest coding unit. A depth of the largest coding unit may be defined as an uppermost depth, and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture may be split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a final encoding result according to the at least one split region. In other words, the coding unit determiner 820 determines a final depth by encoding the image data in the deeper coding units according to depths, according to the largest coding unit of the current picture, and selecting a depth having the least encoding error. The determined final depth and the image data according to the largest coding units are output to the output unit 830.

The image data in the largest coding unit is encoded based on the deeper coding units according to at least one depth equal to or below the maximum depth, and results of encoding the image data are compared based on each of the deeper coding units. A depth having the least encoding error may be selected after comparing encoding errors of the deeper coding units. At least one final depth may be selected for each largest coding unit.

The size of the largest coding unit is split as a coding unit is hierarchically split according to depths, and the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors according to depths may differ according to regions in the one largest coding unit, and thus the final depth may differ according to regions in the image data. Thus, one or more final depths may be determined in one largest coding unit, and the image data of the largest coding unit may be divided according to coding units of at least one final depth.

Accordingly, the coding unit determiner 820 may determine coding units having a tree structure included in the current largest coding unit. The 'coding units having a tree structure" according to an embodiment include coding units of a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0 through 4 exist. Thus, the first maximum depth may be set to 4, and the second maximum depth may be set to 5.

Prediction encoding and transformation may be performed according to the largest coding unit. The prediction encoding and the transformation are also performed based on the deeper coding unit according to a depth equal to or less than the maximum depth, according to the largest coding unit.

Since the number of deeper coding units increases whenever the largest coding unit is split according to depths, encoding including the prediction encoding and the transformation is performed on all of the deeper coding units generated as the depth deepens. For convenience of explanation, the prediction encoding and the transformation will now be described based on a coding unit of a current depth from among at least one largest coding unit.

The video encoding apparatus 800 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit of a final depth according to an embodiment, i.e., based on a coding unit that is no longer split. The coding unit that is no longer split and becomes a basis unit for prediction encoding will now be referred to as a 'prediction unit'. A partition obtained by splitting the prediction unit may include a data unit obtained by splitting at least one of a height and a width of the prediction unit, and the prediction unit. A partition is a data unit where a prediction unit of a coding unit is split, and a prediction unit may be a partition having the same size as a coding unit.

For example, when a coding unit of 2N×2N (where N is a positive integer) is no longer split, the coding unit becomes a prediction unit of 2N×2N, and a size of a partition may be 2N×2N, 2N×N, N×2N, or N×N. Examples of a partition mode according to an embodiment may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having predetermined shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. Encoding may be independently performed on one prediction unit in a coding unit, thereby selecting a prediction mode having a least encoding error.

The video encoding apparatus 800 according to an embodiment may also perform the transformation on the image data in a coding unit, based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

In a manner similar to that in which a coding unit according to an embodiment is split according to the tree structure, the transformation unit in the coding unit may also be recursively split into smaller sized transformation units, and simultaneously, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about the depth, but also about information related to prediction and transformation. Accordingly, the coding unit determiner 820 may not only determine a depth having a minimum encoding error, but also determine a partition mode in which a prediction unit is split into partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9-19.

The coding unit determiner 820 may measure an encoding error of deeper coding units by using Rate-Distortion Optimization based on Lagrangian multipliers.

The output unit 830 outputs the image data of the largest coding unit, which is encoded based on the at least one depth determined by the coding unit determiner 820, and the split information according to depths, in bitstreams.

The encoded image data may be obtained by encoding residual data of an image.

The split information according to depths may include depth information, partition mode information of a prediction unit, prediction mode information, split information of a transformation unit.

Final depth information may be defined by using split information according to depths, which indicates whether to encode coding units of a lower depth instead of a current depth. If the current depth of the current coding unit is a depth, the current coding unit is encoded, and thus split information of the current depth may be defined not to split the current coding unit to a lower depth. On the other hand, if the current depth of the current coding unit is not the depth, encoding should be performed on the coding unit of the lower depth, and thus the split information of the current depth may be defined to split the current coding unit to obtain the coding units of the lower depth.

If the current depth is not the depth, encoding is performed on the coding unit that is split into the coding unit of the lower depth. Since at least one coding unit of the lower depth exists in a coding unit of the current depth, the encoding is repeatedly performed on each coding unit of the lower depth, and thus the encoding may be recursively performed on the coding units having the same depth.

Since the coding units having a tree structure are determined for one largest coding unit and at least one split information should be determined for a coding unit of each depth, at least one split information may be determined for one largest coding unit. Also, a depth of the data of the largest coding unit may be different according to locations since the data is hierarchically split according to depths, and thus depth and split information may be set for the data.

Accordingly, the output unit 830 according to an embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a largest square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information related to prediction, prediction information, and slice type information.

In the video encoding apparatus 800 according to the simplest embodiment, the deeper coding unit is a coding unit obtained by dividing a height and width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 coding units each with the lower depth having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering image characteristics of the coding unit of various image sizes.

Thus, if an image having a very high resolution or a very large data amount is encoded in a conventional macroblock, the number of macroblocks per picture excessively increases. Accordingly, the number of pieces of compressed information generated for each macroblock increases, and thus transmitting the compressed information is difficult and data compression efficiency decreases. Accordingly, by using the video encoding apparatus 800 according to an embodiment, image compression efficiency may be increased since a coding unit is adjusted while considering image characteristics while increasing a maximum size of a coding unit while considering a size of an image.

An inter-layer video encoding apparatus including the components described above with reference to FIG. 1A may include as many video encoding apparatuses 800 as the number of layers, in order to encode single-layer images according to layers of a multi-layer video. For example, the first layer encoder may include one video encoding apparatus 800 and the second layer encoder may include as many video encoding apparatuses 800 as the number of second layers.

When the video encoding apparatus 800 encodes first layer images, the coding unit determiner 820 may determine, for each largest coding unit, a prediction unit for prediction according to coding units having a tree structure, and perform inter-image prediction according to prediction units.

Even when the video encoding apparatus 800 encodes second layer images, the coding unit determiner 820 may determine, for each largest coding unit, coding units and prediction units having a tree structure, and perform inter-prediction according to prediction units.

The video encoding apparatus 800 may encode a brightness difference between the first and second layer images for compensating for the brightness difference. However, whether to perform brightness compensation may be determined according to an encoding mode of a coding unit. For example, the brightness compensation may be performed only on a prediction unit of 2N×2N.

FIG. 9 is a block diagram of a video decoding apparatus according to various embodiments based on coding units having a tree structure 900.

The video decoding apparatus according to an embodiment involving video prediction based on coding units having a tree structure 900 includes a receiver 910, an image data and encoding information extractor 920, and an image data decoder 930. For convenience of explanation, the video decoding apparatus according to an embodiment involving video prediction based on coding units according to a tree structure 900 will be abbreviated to the 'video decoding apparatus 900'.

Definitions of various terms, such as a coding unit, a depth, a prediction unit, a transformation unit, and various pieces of split information, for decoding operations of the video decoding apparatus 900 are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information for the coding units having a tree structure according to each largest coding unit, from the parsed bitstream. The extracted final depth and split information are output to the image data decoder 930. In other words, the image data in a bit stream is split into the largest coding unit so that the image data decoder 930 decodes the image data for each largest coding unit.

The depth and split information according to largest coding units may be set for at least one depth information, and split information according to depths may include information about a partition mode of a corresponding coding unit, prediction mode information, and split information of a transformation unit. Also, split information according to depths may be extracted as the depth information.

The depth and split information according to each largest coding unit extracted by the image data and encoding information extractor 920 is depth and split information determined to generate a minimum encoding error when an encoder, such as the video encoding apparatus 800 according to an embodiment, repeatedly performs encoding for each deeper coding unit according to each largest coding unit. Accordingly, the video decoding apparatus 900 may reconstruct an image by decoding the image data according to an encoding method that generates the minimum encoding error.

Since encoding information according to an embodiment about the depth and the encoding mode may be assigned to a predetermined data unit from among a corresponding coding unit, a prediction unit, and a minimum unit, the image data and encoding information extractor 920 may extract the depth and split information according to the predetermined data units. If depth and split information of a corresponding largest coding unit is recorded according to predetermined data units, the predetermined data units to which the same depth and split information is assigned may be inferred to be the data units included in the same largest coding unit.

The image data decoder 930 may reconstruct the current picture by decoding the image data in each largest coding unit based on the depth and split information according to the largest coding units. In other words, the image data decoder 930 may decode the encoded image data based on a read-out partition mode, a prediction mode, and a transformation unit for each coding unit from among the coding units having the tree structure included in each largest coding unit. A decoding process may include a prediction including intra prediction and motion compensation, and an inverse transformation.

The image data decoder 930 may perform intra prediction or motion compensation according to a partition and a prediction mode of each coding unit, based on the information about the partition mode and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each largest coding unit. Via the inverse transformation, a pixel value of a spatial domain of the coding unit may be reconstructed.

The image data decoder 930 may determine a depth of a current largest coding unit by using split information according to depths. If the split information indicates that image data is no longer split in a current depth, the current depth is a depth. Accordingly, the image data decoder 930 may decode a coding unit of the current depth for image data of the current largest coding unit, by using the information about the partition mode of the prediction unit, about the prediction mode, and about the size of the transformation unit.

In other words, data units containing the encoding information including the same split information may be gathered by observing the encoding information set for the predetermined data unit from among the coding unit, the prediction unit, and the minimum unit, and the gathered data units may be considered to be one data unit that is to be decoded by the image data decoder 930 in the same encoding mode. The current coding unit may be decoded by obtaining information about the encoding mode for each coding unit determined as described above.

The interlayer video decoding apparatus including the structure described with reference to FIG. 2A may include as many video decoding apparatuses 900 as the number of views in order to decode a received first layer image stream and a received second layer image stream to reconstruct first layer images and second layer images.

When the first layer image stream is received, the image data decoder 930 of the video decoding apparatus 900 may split samples of first layer images extracted from the first layer image stream by the image data and encoding information extractor 920 into coding units having a tree structure of a largest coding unit. The image data decoder 930 may reconstruct the first layer images by performing motion compensation according to prediction units for inter-image prediction, on each of the coding units having the tree structure obtained by splitting the samples of the first layer images.

When the second layer image stream is received, the image data decoder 930 of the video decoding apparatus 900 may split samples of second layer images extracted from the second layer image stream by the image data and encoding information extractor 920 into coding units having a tree structure of a largest coding unit. The image data decoder 930 may reconstruct the second layer images by performing motion compensation according to prediction units for inter-image prediction, on each of the coding units having the tree structure obtained by splitting the samples of the second layer images.

The extractor 920 may obtain information related with a brightness difference between the first and second layer images from a bitstream in order to compensate for the brightness difference. However, whether to perform brightness compensation may be determined according to an encoding mode of a coding unit. For example, the brightness compensation may be performed only on a prediction unit of 2N×2N.

Finally, the video decoding apparatus 900 may obtain information about a coding unit having a minimum encoding error by recursively encoding each largest coding unit, and may use the obtained information in decoding a current picture. In other words, encoded image data of coding units having a tree structure determined to be the optimum coding unit for each largest coding unit may be decoded.

Accordingly, even if an image has a high resolution or an excessively large amount of data, image data may be efficiently decoded and reconstructed by using a size of a coding unit and an encoding mode, which are adaptively determined according to characteristics of the image, by using optimum split information received from an encoder.

Figure 10:
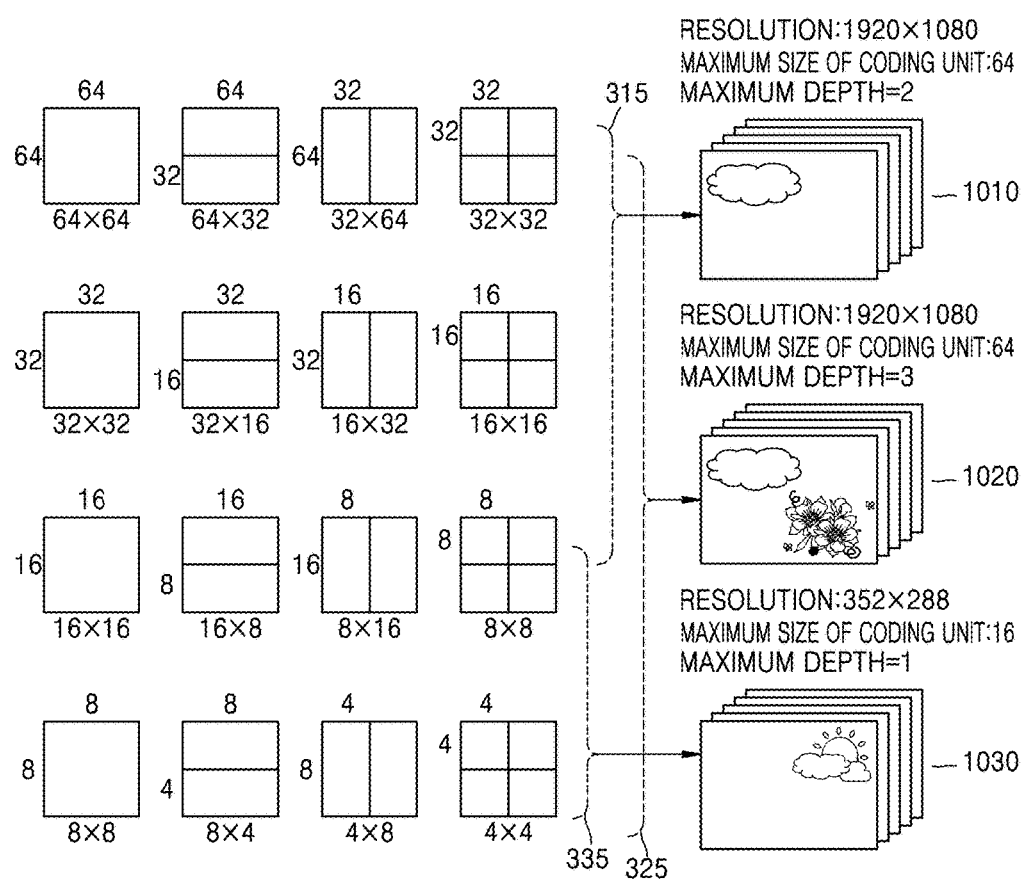
FIG. 10 is a diagram for describing a concept of coding units according to various embodiments.

FIG. 10 is a diagram for describing a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes a total number of splits from a largest coding unit to a smallest decoding unit.

If a resolution is high or a data amount is large, a maximum size of a coding unit may be large so as to not only increase encoding efficiency but also to accurately reflect characteristics of an image. Accordingly, the maximum size of the coding unit of the video data 10110 and 1020 having a higher resolution than the video data 1030 may be 64.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the vide data 1020 may include a largest coding unit having a long axis size of 64, and coding units having long axis sizes of 32, 16, and 8 since depths are deepened to three layers by splitting the largest coding unit three times. As a depth deepens, detailed information may be precisely expressed.

Figure 11:
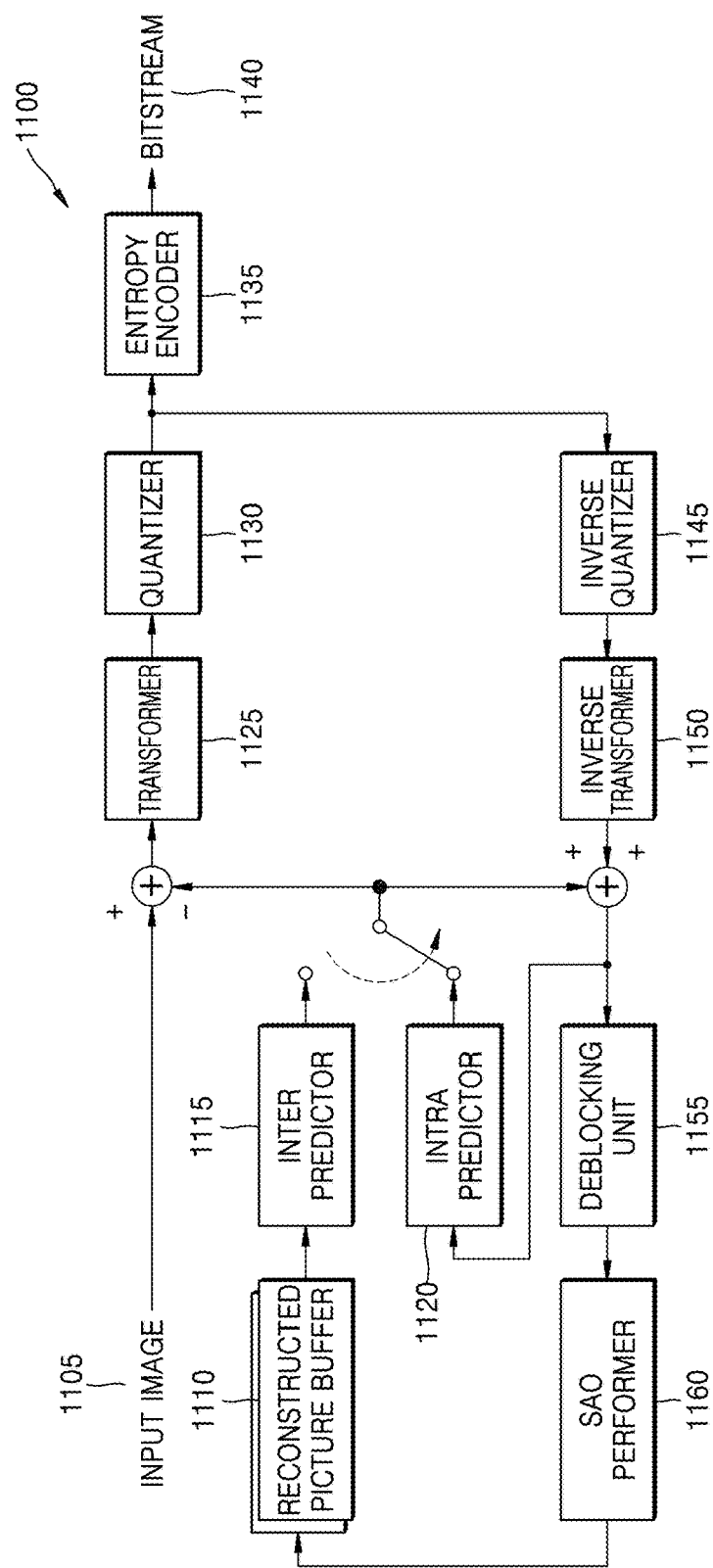
FIG. 11 is a block diagram of an image encoder based on coding units, according to various embodiments.

FIG. 11 is a block diagram of a video encoder 1100 based on coding units, according to various embodiments.

The video encoder 1100 according to an embodiment performs operations necessary for encoding image data in a picture encoder 1520 of the video encoding apparatus 800. In other words, an intra predictor 1120 performs intra prediction on coding units in an intra mode according to prediction units, from among a current frame 1105, and an inter predictor 1115 performs inter prediction on coding units in an inter mode by using a current image 1105 and a reference image obtained from a reconstructed picture buffer 1110 according to prediction units. The current image 1105 may be split into largest coding units and then the largest coding units may be sequentially encoded. In this regard, coding units into which the largest coding units are to be split according to a tree structure may be encoded.

Residue data is generated by removing prediction data regarding coding units of each mode that is output from the intra predictor 1120 or the inter predictor 1115 from data regarding encoded coding units of the current image 1105, and is output as a quantized transformation coefficient according to transformation units through a transformer 1125 and a quantizer 1130. The quantized transformation coefficient is reconstructed as the residue data in a spatial domain through an inverse quantizer 1145 and an inverse transformer 1150. The reconstructed residue data in the spatial domain is added to prediction data for coding units of each mode that is output from the intra predictor 1120 or the inter predictor 1115 and thus is reconstructed as data in a spatial domain for coding units of the current image 1105.

The reconstructed data in the spatial domain is generated as reconstructed images through a de-blocking unit 1155 and an SAO performer 1160 and the reconstructed images are stored in the reconstructed picture buffer 1110. The reconstructed images stored in the reconstructed picture buffer 1110 may be used as reference images for inter prediction of another image. The transformation coefficient quantized by the transformer 1125 and the quantizer 1130 may be output as a bitstream 1140 through an entropy encoder 1135.

In order for the video encoder 1100 according to an embodiment to be applied in the video encoding apparatus 800, all elements of the video encoder 1100, i.e., the inter predictor 1115, the intra predictor 1120, the transformer 1125, the quantizer 1130, the entropy encoder 1135, the inverse quantizer 1145, the inverse transformer 1150, the de-blocking unit 1155, and the SAO performer 1160, perform operations based on each coding unit among coding units having a tree structure according to each largest coding unit.

In particular, the intra predictor 1120 and the inter predictor 1115 may determine a partition mode and a prediction mode of each coding unit among the coding units having a tree structure in consideration of a maximum size and a maximum depth of a current largest coding unit, and the transformer 1125 may determine whether to split a transformation unit having a quad tree structure in each coding unit among the coding units having a tree structure.

Figure 12:
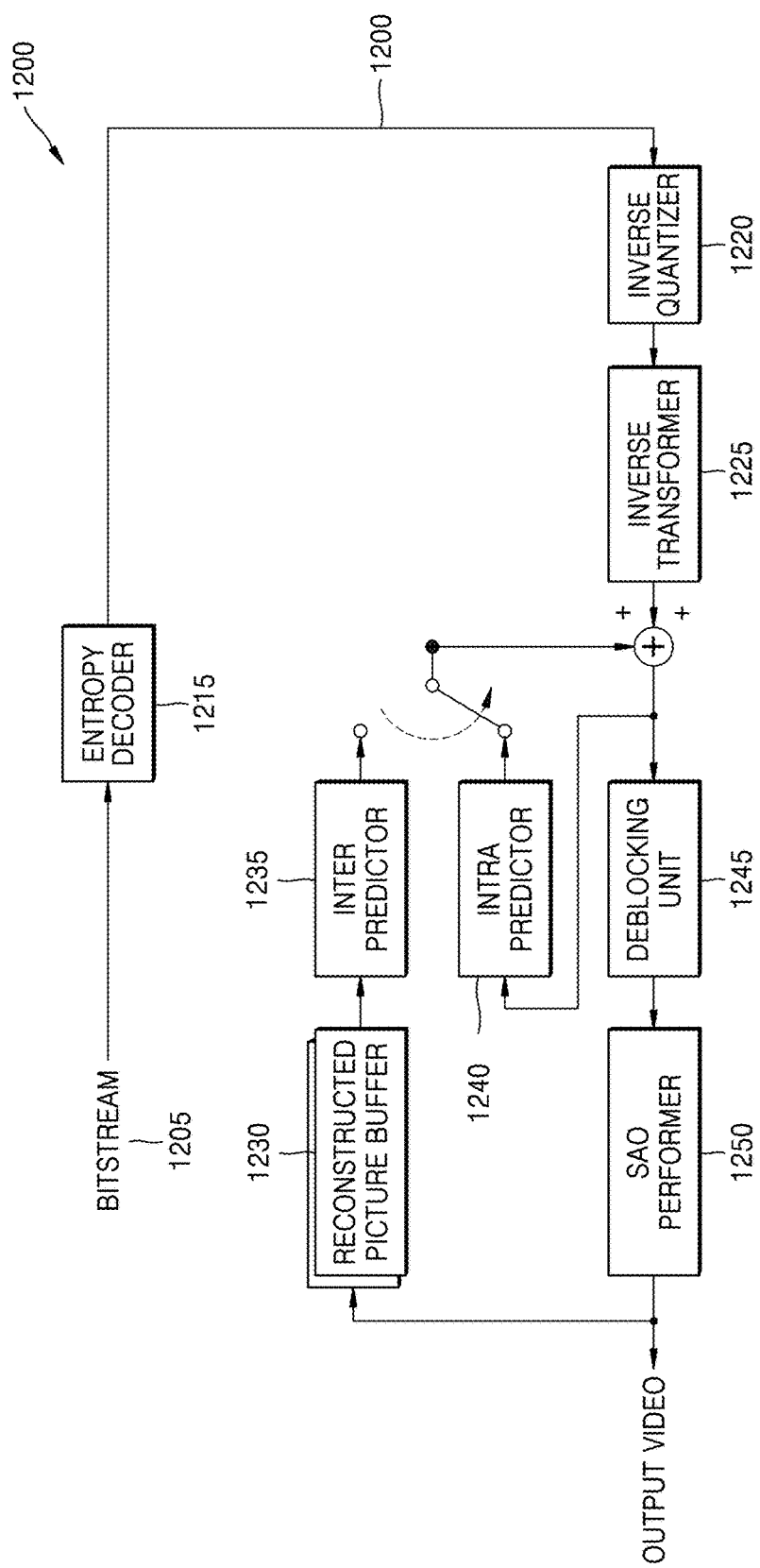
FIG. 12 is a block diagram of an image decoder based on coding units, according to various embodiments.

FIG. 12 is a block diagram of a video decoder 1200 based on coding units, according to various embodiments.

An entropy decoder 1215 parses encoded image data to be decoded and encoding information required for decoding from a bitstream 1205. The encoded image data is a quantized transformation coefficient from which residue data is reconstructed by an inverse quantizer 1220 and an inverse transformer 1225.

An intra predictor 1240 performs intra prediction on coding units in an intra mode according to each prediction unit. An inter predictor 1235 performs inter prediction on coding units in an inter mode from among the current image for each prediction unit by using a reference image obtained from a reconstructed picture buffer 1230.

Prediction data and residue data regarding coding units of each mode, which passed through the intra predictor 1240 or the inter predictor 1235, are summed, and thus data in a spatial domain regarding coding units of the current image 1105 may be reconstructed, and the reconstructed data in the spatial domain may be output as a reconstructed image 1260 through a de-blocking unit 1245 and an SAO performer 1250. Reconstructed images stored in the reconstructed picture buffer 1230 may be output as reference images.

In order to decode the image data in a picture decoder 930 of the video decoding apparatus 900, operations after the entropy decoder 1215 of the video decoder 1200 according to an embodiment may be performed.

In order for the video decoder 1200 to be applied in the video decoding apparatus 900 according to an embodiment, all elements of the video decoder 1200, i.e., the entropy decoder 1215, the inverse quantizer 1220, the inverse transformer 1225, the intra predictor 1240, the inter predictor 1235, the de-blocking unit 1245, and the SAO performer 1250 may perform operations based on coding units having a tree structure for each largest coding unit.

In particular, the intra predictor 1240 and the inter predictor 1235 may determine a partition mode and a prediction mode for each of the coding units having a tree structure, and the inverse transformer 1225 may determine whether to split a transformation unit having a quad tree structure for each of the coding units.

The coding operation of FIG. 10 and the decoding operation of FIG. 11 respectively describe video stream encoding and decoding operations in a single layer. Thus, if the encoder of FIG. 1A encodes a video stream of at least two layers, the image encoder 1100 may be included for each layer. Similarly, when the decoder 26 of FIG. 2A decodes a video stream of at least two layers, the image decoder 1200 may be included for each layer.

Figure 13:
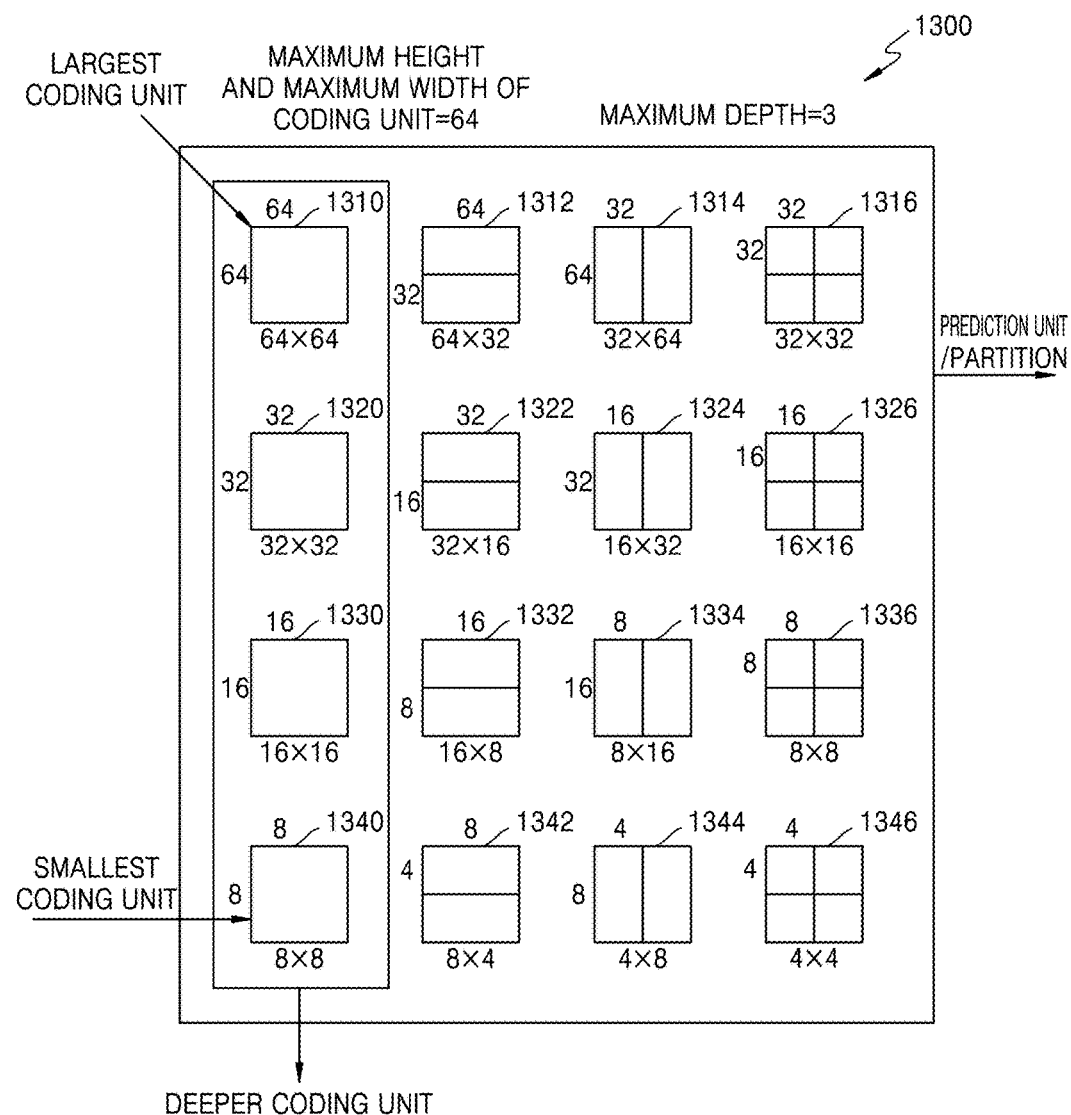
FIG. 13 is a diagram illustrating deeper coding units according to depths, and partitions, according to various embodiments.

FIG. 13 is a diagram illustrating deeper coding units according to depths, and partitions, according to various embodiments.

The video encoding apparatus 800 according to an embodiment and the video decoding apparatus 900 according to an embodiment use hierarchical coding units so as to consider characteristics of an image. A maximum height, a maximum width, and a maximum depth of coding units may be adaptively determined according to the characteristics of the image, or may be differently set according to demands of users. Sizes of deeper coding units according to depths may be determined according to the predetermined maximum size of the coding unit.

In a hierarchical structure 1300 of coding units according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure 1300 of coding units according to an embodiment, a height and a width of the deeper coding unit are each split. Also, a prediction unit and partitions, which are bases for prediction encoding of each deeper coding unit, are shown along a horizontal axis of the hierarchical structure 1300 of coding units.

In other words, a coding unit 1310 is a largest coding unit in the hierarchical structure 1300 of coding units, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3 exist. The coding unit 1340 having a size of 8×8 and a depth of 3 is a smallest coding unit.

The prediction unit and the partitions of a coding unit are arranged along the horizontal axis according to each depth. In other words, if the coding unit 1310 having a size of 64×64 and a depth of 0 is a prediction unit, the prediction unit may be split into partitions included in the encoding unit 1310 having the size of 64×64, i.e. a partition 1310 having a size of 64×64, partitions 1312 having the size of 64×32, partitions 1314 having the size of 32×64, or partitions 1316 having the size of 32×32.

Similarly, a prediction unit of the coding unit 1320 having the size of 32×32 and the depth of 1 may be split into partitions included in the coding unit 1320, i.e. a partition 1320 having a size of 32×32, partitions 1322 having a size of 32×16, partitions 1324 having a size of 16×32, and partitions 1326 having a size of 16×16.

Similarly, a prediction unit of the coding unit 1330 having the size of 16×16 and the depth of 2 may be split into partitions included in the coding unit 1330, i.e. a partition 1330 having a size of 16×16, partitions 1332 having a size of 16×8, partitions 1334 having a size of 8×16, or partitions 1336 having a size of 8×8.

Similarly, a prediction unit of the coding unit 1340 having the size of 8×8 and the depth of 3 may be split into partitions included in the coding unit 1340, i.e. a partition 1340 having a size of 8×8, partitions 1342 having a size of 8×4, partitions 1344 having a size of 4×8, and partitions 1346 having a size of 4×4.

In order to determine the depth of the largest coding unit 1310, the coding unit determiner 820 of the video encoding apparatus 800 according to an embodiment should perform encoding for coding units corresponding to each depth included in the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, one coding unit corresponding to the depth of 1 and four coding units corresponding to the depth of 2 should be each encoded.

In order to perform encoding for a current depth from among the depths, a representative encoding error, which is a least encoding error, may be selected for the current depth by performing encoding for each prediction unit in the coding units corresponding to the current depth, along the horizontal axis of the hierarchical structure 1300. Alternatively, the minimum encoding error may be searched for by comparing the representative encoding errors according to depths, by performing encoding for each depth as the depth deepens along the vertical axis of the hierarchical structure 1300. A depth and a partition having the minimum encoding error in the smallest coding unit 1310 may be selected as a depth and a partition mode of the smallest coding unit 1310.

FIG. 14 is a diagram for describing a relationship between a coding unit and transformation units, according to various embodiments.

The video encoding apparatus 800 according to an embodiment or the video decoding apparatus 900 according to an embodiment encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 800 according to an embodiment or the video decoding apparatus 900 according to an embodiment, if a size of a current coding unit 1410 is 64×64, transformation may be performed by using a transformation unit 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 is a diagram for describing pieces of encoding information according to various embodiments.

The output unit 830 of the video encoding apparatus 800 according to an embodiment may encode and transmit information 1500 about a partition mode, information 1510 about a prediction mode, and information 1520 about a size of a transformation unit for each coding unit corresponding to a depth, as split information.

The information 1500 about the partition mode indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N and may be used. In this case, the information 1500 about a partition mode of the current coding unit is set to indicate one of the partition 1502 having a size of 2N×2N, the partition 1504 having a size of 2N×N, the partition 1506 having a size of N×2N, and the partition 1508 having a size of N×N.

The information 1510 about the prediction mode indicates a prediction mode of each partition. For example, the information 1510 about the prediction mode may indicate a mode of prediction encoding performed on a partition indicated by the information 1500 about the partition mode, i.e., an intra mode 1512, an inter mode 1514, or a skip mode 1516.

The information 1520 about the size of the transformation unit indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The image data and encoding information extractor 1610 of the video decoding apparatus 900 according to an embodiment may extract the information 1500 about the partition mode, the information 1510 about the prediction mode, and the information 1520 about the transformation unit size according to each deeper coding unit and use the extracted information in decoding.

Figure 16:
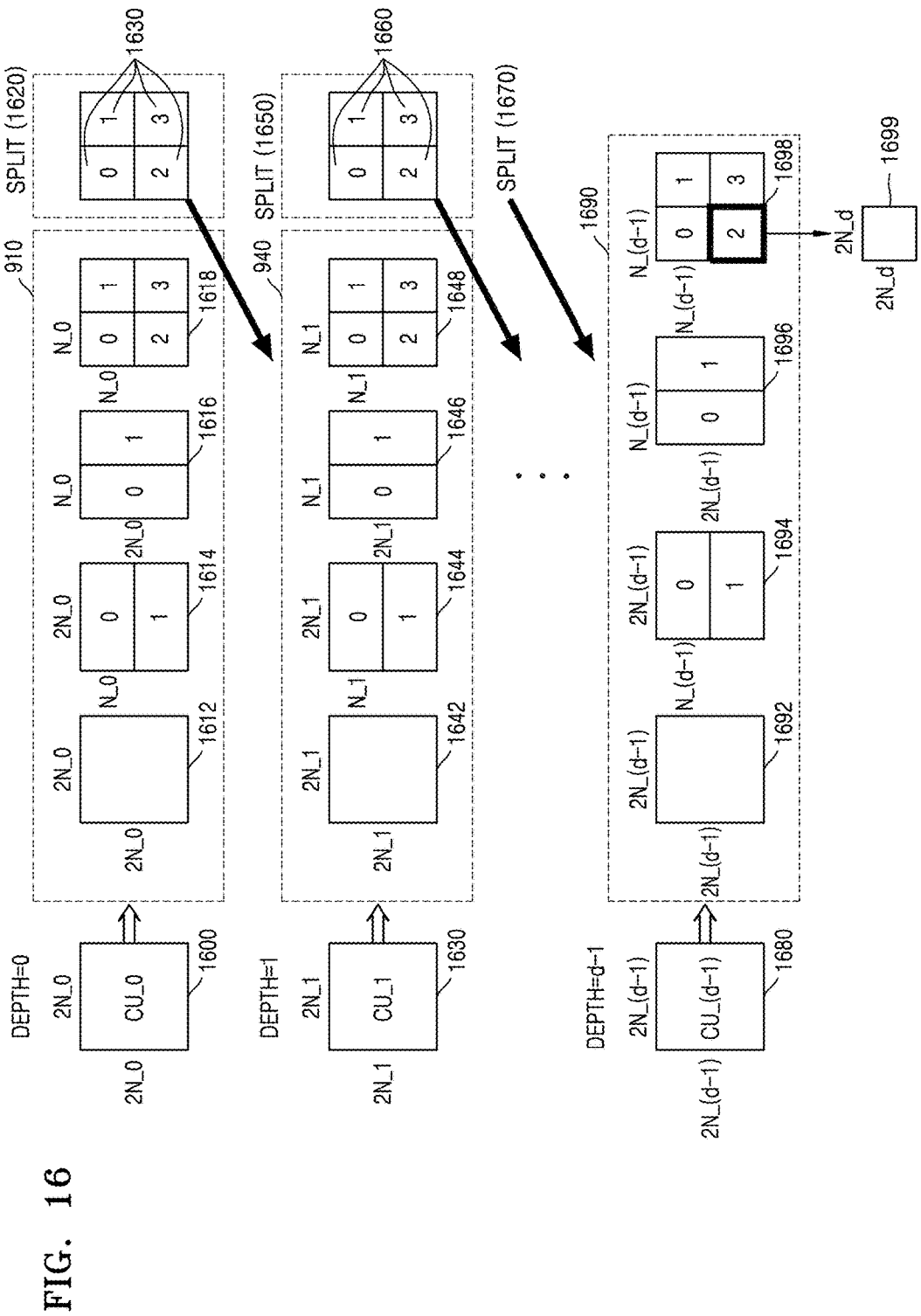
FIG. 16 is a diagram of deeper coding units according to depths, according to various embodiments.

FIG. 16 is a diagram of deeper coding units according to depths, according to various embodiments.

Split information may be used to indicate a change of a depth. The split information indicates whether a coding unit of a current depth is split into coding units of a lower depth.

A prediction unit 1610 for prediction encoding a coding unit 1600 having a depth of 0 and a size of 2N_0×2N_0 may include a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. FIG. 16 only illustrates the partition partitions 1612, 1614, 1616, and 1618 which are obtained by symmetrically splitting the prediction unit 1610, but a partition mode is not limited thereto, and the partitions of the prediction unit 1610 may include asymmetrical partitions, partitions having a predetermined shape, and partitions having a geometrical shape.

Prediction encoding should be repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 1612, 1614, and 1616, the prediction unit 1610 may not be split into a lower depth.

If the encoding error is the smallest in the partition mode 1618 having a size of N_0×N_0, a depth is changed from 0 to 1 to split the partition mode 1618 in operation 1620, and encoding is repeatedly performed on coding units 1630 having a depth of 2 and a size of N_0×N_0 to search for a minimum encoding error.

A prediction unit 1640 for prediction encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648 having a size of N_1×N_1, a depth is changed from 1 to 2 to split the partition mode 1648 in operation 1650, and encoding is repeatedly performed on coding units 1660, which have a depth of 2 and a size of N_2×N_2, to search for a minimum encoding error.

When a maximum depth is d, coding units according to each depth may be set up to when a depth becomes d−1, and split information may be set up to when a depth becomes d−2. In other words, when encoding is performed up to when the depth is d−1 after a coding unit corresponding to a depth of d−2 is split in operation 1670, a prediction unit 1690 for prediction encoding a coding unit 1680 having a depth of d−1 and a size of 2N_(d−1)×2N_(d−1) may include a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition modes 1692 through 1698 to search for a partition mode having a minimum encoding error.

Even when the partition mode 1698 having a size of N_(d−1)×N_(d−1) has the least encoding error, since a maximum depth is d, a coding unit CU_(d−1) having a depth of d−1 is no longer split to a lower depth, and a depth for a current largest coding unit 1600 is determined to be d−1 and a partition mode of the current largest coding unit 1600 may be determined to be N_(d−1)×N_(d−1). Also, since the maximum depth is d, split information for a coding unit 1652 having a depth of d−1 is not set.

A data unit 1699 may be a 'minimum unit' for the current largest coding unit. The minimum unit according to an embodiment may be a square data unit obtained by splitting the smallest coding unit constituting the lowermost depth by 4. By performing the encoding repeatedly, the video encoding apparatus 800 according to an embodiment may select a depth having the least encoding error by comparing encoding errors according to depths of the coding unit 1600 to determine a depth, and set a corresponding partition mode and a prediction mode as an encoding mode of the depth.

As such, the minimum encoding errors according to depths are compared in all of the depths of 0, 1, ..., d−1, and d, and a depth having the least encoding error may be determined as a depth. The depth, the partition mode of the prediction unit, and the prediction mode may be encoded and transmitted as split information. Also, since a coding unit is split from a depth of 0 to a depth, only split information of the depth is set to 0, and split information of depths excluding the depth should be set to 1.

The image data and encoding information extractor 920 of the video decoding apparatus 900 according to an embodiment may extract and use the information about the depth and the prediction unit of the coding unit 1600 to decode the coding unit 1612. The video decoding apparatus 900 according to an embodiment may determine a depth, in which split information is 0, as a depth by using split information according to depths, and use split information about a corresponding depth for decoding.

Figure 17:
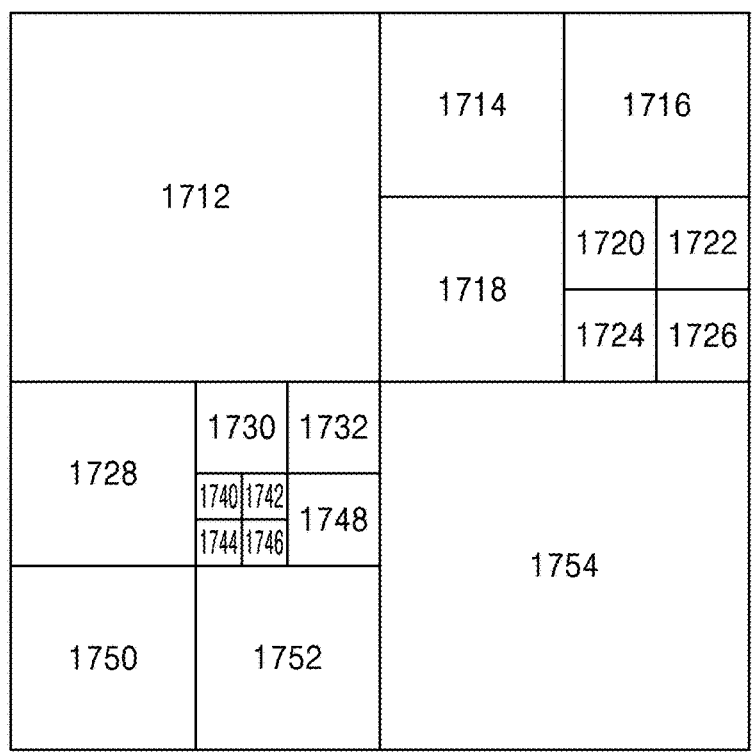
FIGS. 17-19 are diagrams for describing a relationship between coding units, prediction units, and transformation units, according to various embodiments.
Figure 18:
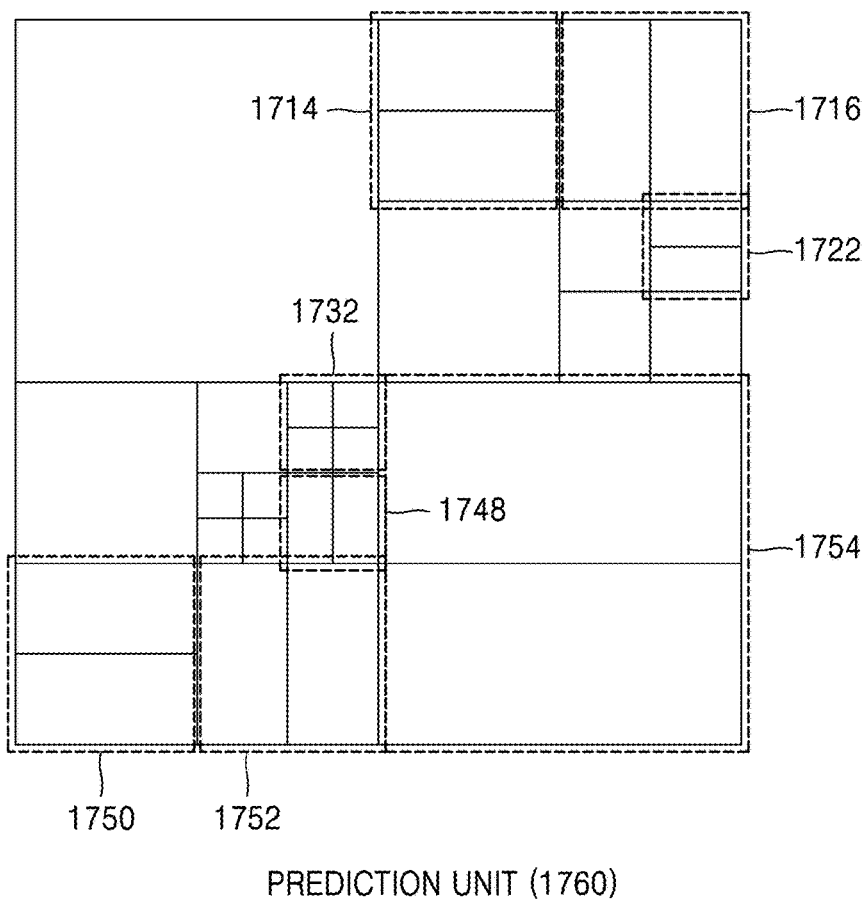
Figure 19:
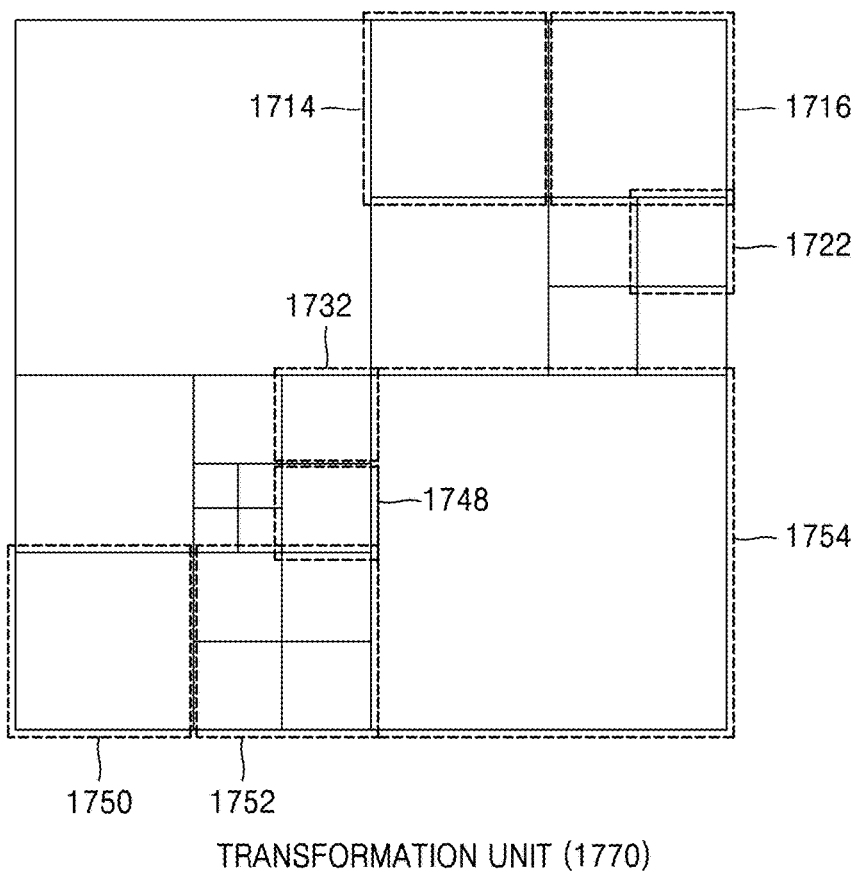

FIGS. 17-19 are diagrams for describing a relationship between coding units, prediction units, and transformation units, according to various embodiments.

Coding units 1710 are coding units corresponding to depths determined by the video encoding apparatus 800 according to an embodiment, in a largest coding unit. Prediction units 1760 are partitions of prediction units of each of the coding units 1710, and transformation units 1770 are transformation units of each of the coding units 1710.

When a depth of a largest coding unit is 0 in the coding units 1710 according to depths, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

In the prediction units 1760, some partitions 1714, 1716, 1722, 1732, 1748, 1750, 1752, and 1754 are obtained by splitting the coding units. In other words, partition modes in the coding units 1714, 1722, 1750, and 1754 have a size of 2N×N, partition modes in the coding units 176, 1748, and 1752 have a size of N×2N, and a partition mode of the coding unit 1732 has a size of N×N. Prediction units and partitions of the coding units 1710 according to depths are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1770 are data units different from those in the prediction units 1760 in terms of sizes or shapes. In other words, the video encoding and decoding apparatuses 800 and 900 according to an embodiment may perform intra prediction/motion estimation/motion compensation and transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition mode, information about a prediction mode, and information about a size of a transformation unit. Table 5 shows encoding information that may be set by the video encoding and decoding apparatuses 800 and 900 according to an embodiment.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having |
| Intra | Symmetrical | Asymmetrical | Split | Split | |

TABLE 1-continued

| Split Information 0 (Encoding on Coding Unit having Size of 2N × 2N and Current Depth of d) | | | | | Split Information 1 |
|---|---|---|---|---|---|
| Inter Skip (Only 2N × 2N) | Partition Type  2N × 2N  2N × N  N × 2N  N × N | Partition Type  2N × nU  2N × nD  nL × 2N  nR × 2N | Information 0 of Transformation Unit  2N × 2N | Information 1 of Transformation Unit  N × N (Symmetrical Partition Type)  N/2 × N/2 (Asymmetrical Partition Type) | Lower Depth of d + 1 |

The output unit 830 of the video encoding apparatus 800 according to an embodiment may output encoding information about the coding units having a tree structure, and the image data and encoding information extractor 920 of the video decoding apparatus 900 according to an embodiment may extract the encoding information about the coding units having a tree structure from a received bitstream.

The split information indicates whether a current coding unit is split into coding units of a lower depth. If split information of a current depth d is 0, a depth, in which a current coding unit is no longer split into coding units of a lower depth, is a depth, and thus information about a partition mode, a prediction mode, and a size of a transformation unit may be defined for the depth. If the current coding unit is to be further split according to the split information, encoding should be independently performed on four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit is set to be 2N×2N, which is the size of the current coding unit. If split information of the transformation unit is 1, the transformation units may be set to be the size of a result of splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information of coding units having a tree structure, according to an embodiment, may be allocated to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing respective encoding information of the adjacent data units. Also, a corresponding coding unit corresponding to a depth may be determined by using encoding information of a data unit, and thus a distribution of depths in a largest coding unit may be inferred.

Accordingly, in this case, when a current coding unit is predicted based on encoding information of adjacent data units, encoding information of data units in deeper coding units adjacent to the current coding unit may be directly referred to and used.

Alternatively, when a current coding unit is prediction encoded based on encoding information of adjacent data units, data adjacent to the current coding unit are searched from deeper coding units by using encoding information of adjacent deeper coding units, and thus adjacent coding units may be referred to.

Figure 20:
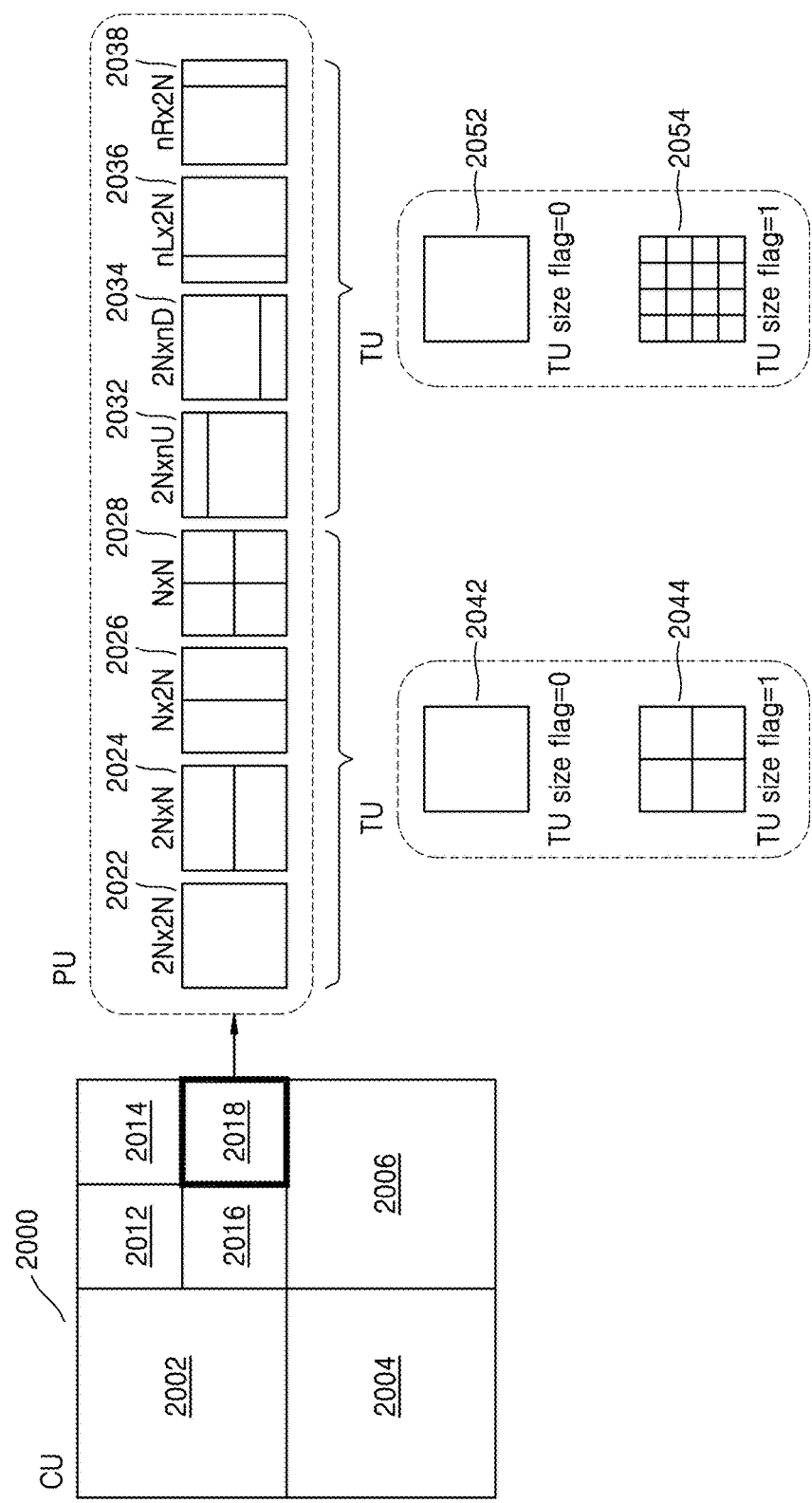
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A largest coding unit 2000 includes coding units 2002, 2004, 2006, 2012, 2014, 2016, and 2018 of depths. Here, since the coding unit 2018 is a coding unit of a depth, split information may be set to 0. Information about a partition mode of the coding unit 2018 having a size of 2N×2N may be set to be one of a partition mode 2022 having a size of 2N×2N, a partition mode 2024 having a size of 2N×N, a partition mode 2026 having a size of N×2N, a partition mode 2028 having a size of N×N, a partition mode 2032 having a size of 2N×nU, a partition mode 2034 having a size of 2N×nD, a partition mode 2036 having a size of nL×2N, and a partition mode 2038 having a size of nR×2N.

Transformation unit split information (TU size flag) is a type of a transformation index. The size of the transformation unit corresponding to the transformation index may be changed according to a prediction unit type or partition mode of the coding unit.

For example, when the partition mode information is set to be symmetrical, i.e. the partition mode 2022, 2024, 2026, or 2028, a transformation unit 2042 having a size of 2N×2N may be set if a TU size flag is 0, and a transformation unit 2044 having a size of N×N may be set if a TU size flag is 1.

When the partition mode information is set to be asymmetrical, i.e., the partition mode 2032, 2034, 2036, or 2038, a transformation unit 2052 having a size of 2N×2N may be set if a TU size flag is 0, and a transformation unit 2054 having a size of N/2×N/2 may be set if a TU size flag is 1.

The TU size flag described above with reference to FIG. 19 is a flag having a value or 0 or 1, but the TU size flag according to an embodiment is not limited to a 1-bit flag, and a transformation unit may be hierarchically split having a tree structure while the TU size flag increases from 0. The transformation unit split information (TU size flag) may be an example of a transformation index.

In this case, when the TU size flag according to an embodiment is used together with a maximum size of a transformation unit and a minimum size thereof, the size of an actually used transformation unit may be expressed. The video encoding apparatus 800 according to an embodiment may encode size information of a largest transformation unit, size information of a smallest transformation unit, and split information of the largest transformation unit. The encoded size information of the largest transformation unit, the encoded size information of the smallest transformation unit, and the split information of the largest transformation unit may be inserted into an SPS. The video decoding apparatus 900 according to an embodiment may perform video decoding by using the size information of the largest transformation unit, the size information of the smallest transformation unit, and the split information of the largest transformation unit.

For example, (a) if the size of a current coding unit is 64×64 and a largest transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a smallest transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a largest TU size flag is 1, then the TU size flag may be 0 or 1. Here, the TU size flag cannot be set to a value other than 0 or 1.

Accordingly, when the split information of the largest transformation unit is defined as 'MaxTransformSizeIndex', the size of the smallest transformation unit is defined as 'MinTransformSize', and the size of a transformation unit when the TU size flag is 0 is defined as 'RootTuSize', a smallest transformation unit size possible at a current coding unit, 'CurrMinTuSize', may be defined as the following Equation 1:

$$\text{CurrMinTuSize} = \max(\text{MinTransformSize}, \text{RootTuSize}/2^{\text{MaxTransformSizeIndex}})) \quad (1)$$

In comparison with the minimum transformation unit size possible at a current coding unit, 'CurrMinTuSize', the transformation unit size when the TU size flag is 0, 'RootTuSize', may represent a maximum transformation unit size that can be employed in the system. In other words, according to Equation 1, since 'RootTuSize/2^MaxTransformSizeIndex' denotes a transformation unit size obtained by splitting the transformation unit size when the TU size flag is 0, 'RootTuSize', by a number of times corresponding to the split information of the maximum transformation unit, and 'MinTransformSize' denotes a minimum transformation unit size, a smaller size from among the two sizes may be the minimum transformation unit size possible at the current coding unit, 'CurrMinTuSize'.

The maximum transformation unit size RootTuSize according to an embodiment may vary depending on the type of a prediction mode.

For example, when a current prediction mode is an inter mode, RootTuSize may be determined according to Equation 2 below, where 'MaxTransformSize' indicates a maximum transformation unit size and 'PUSize' indicates a current prediction unit size:

$$\text{RootTuSize} = \min(\text{MaxTransformSize}, \text{PUSize}) \quad (2)$$

In other words, when the current prediction mode is an inter mode, the transformation unit size when the TU size flag is 0, 'RootTuSize', may be set to be a smaller size from among the maximum transformation unit size and the current prediction unit size.

When a prediction mode of a current partition unit is an intra mode, 'RootTuSize' may be determined according to Equation 3 below, where 'PartitionSize' indicates the size of the current partition unit:

$$\text{RootTuSize} = \min(\text{MaxTransformSize}, \text{PartitionSize}) \quad (3)$$

In other words, when the current prediction mode is an intra mode, the transformation unit size when the TU size flag is 0, 'RootTuSize', may be set to be a smaller size from among the maximum transformation unit size and the current partition unit size.

However, the current maximum transformation unit size 'RootTuSize' according to an embodiment that varies according to the type of a prediction mode in a partition unit is just an example, and the present invention is not limited thereto.

According to the video encoding method based on coding units having a tree structure described above with reference to FIGS. 8-20, image data of a spatial region is encoded for each coding unit of a tree structure. According to the video decoding method based on coding units having a tree structure, decoding is performed for each largest coding unit to reconstruct image data of a spatial domain. Thus, a picture and a video that is a picture sequence may be reconstructed. The reconstructed video may be reproduced by a reproducing apparatus, stored in a storage medium, or transmitted through a network.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., compact disc-read only memory (CD-ROM), or digital versatile discs (DVDs)), etc.

For convenience of description, the video encoding method and/or the video encoding method described above with reference to FIGS. 1A-20 will be collectively referred to as a 'video encoding method of the present invention'. In addition, the video decoding method and/or the video decoding method described above with reference to FIGS. 1A-20 will be referred to as a 'video decoding method of the present invention'.

Also, a video encoding apparatus including the video encoding apparatus, the video encoding apparatus 100, or the image encoder 400, which has been described with reference to FIGS. 1A-20, will be referred to as a 'video encoding apparatus of the present invention'. In addition, a video decoding apparatus including the interlayer video decoding apparatus, the video decoding apparatus 900, or the video decoder 1200, which has been descried with reference to FIGS. 1A-20, will be referred to as a 'video decoding apparatus of the present invention'.

A computer-readable recording medium storing a program, e.g., a disc 26000, according to an embodiment will now be described in detail.

Figure 21:
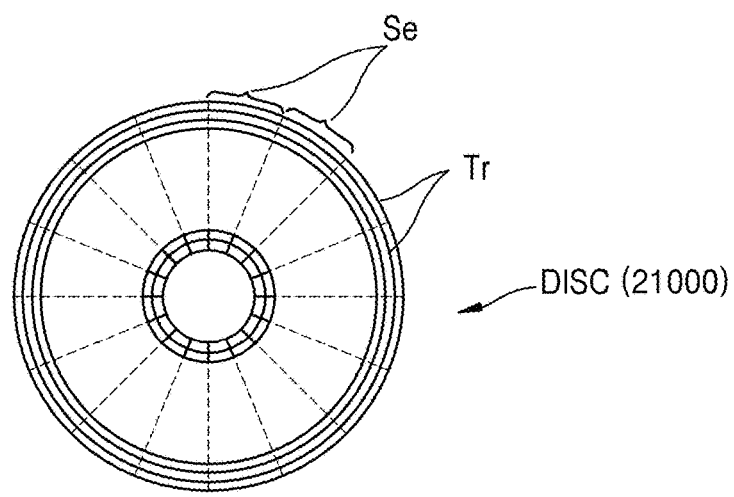
FIG. 21 is a diagram of a physical structure of a disc in which a program is stored, according to various embodiments.

FIG. 21 is a diagram of a physical structure of the disc 26000 in which a program is stored, according to various embodiments. The disc 26000, which is a storage medium, may be a hard drive, a CD-ROM disc, a Blu-ray disc, or a DVD. The disc 26000 includes a plurality of concentric tracks Tr that are each divided into a specific number of sectors Se in a circumferential direction of the disc 26000. In a specific region of the disc 26000 storing a program according to the above-described embodiment, a program that executes the quantization parameter determining method, the video encoding method, and the video decoding method described above may be assigned and stored.

A computer system embodied using a storage medium that stores a program for executing the above-described video encoding method and the above-described video decoding method will now be described with reference to FIG. 22.

Figure 22:
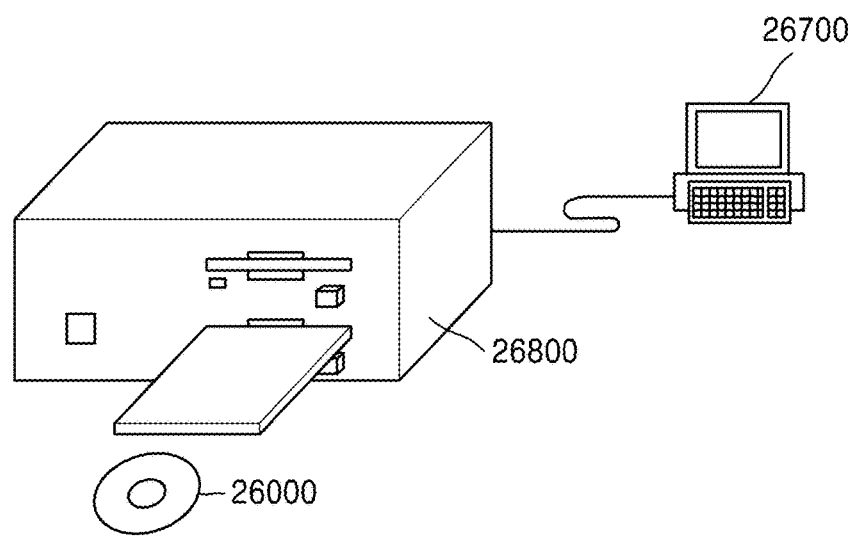
FIG. 22 is a diagram of a disc drive for recording and reading a program by using the disc.

FIG. 22 is a diagram of a disc drive 26800 for recording and reading a program by using the disc 26000. A computer system 27000 may store a program that executes at least one of the video encoding method and the video decoding method of the present invention, in the disc 26000 via the disc drive 26800. To run the program stored in the disc 26000 in the computer system 26700, the program may be read from the disc 26000 by the disc drive 26800 and be transmitted to the computer system 26700.

The program that executes at least one of the video encoding method and the video decoding method of the present invention may be stored not only in the disc 26000 illustrated in FIGS. 21 and 22 but also in a memory card, a ROM cassette, or a solid state drive (SSD).

A system to which the video encoding method and the video decoding method described above are applied will be described below.

Figure 23:
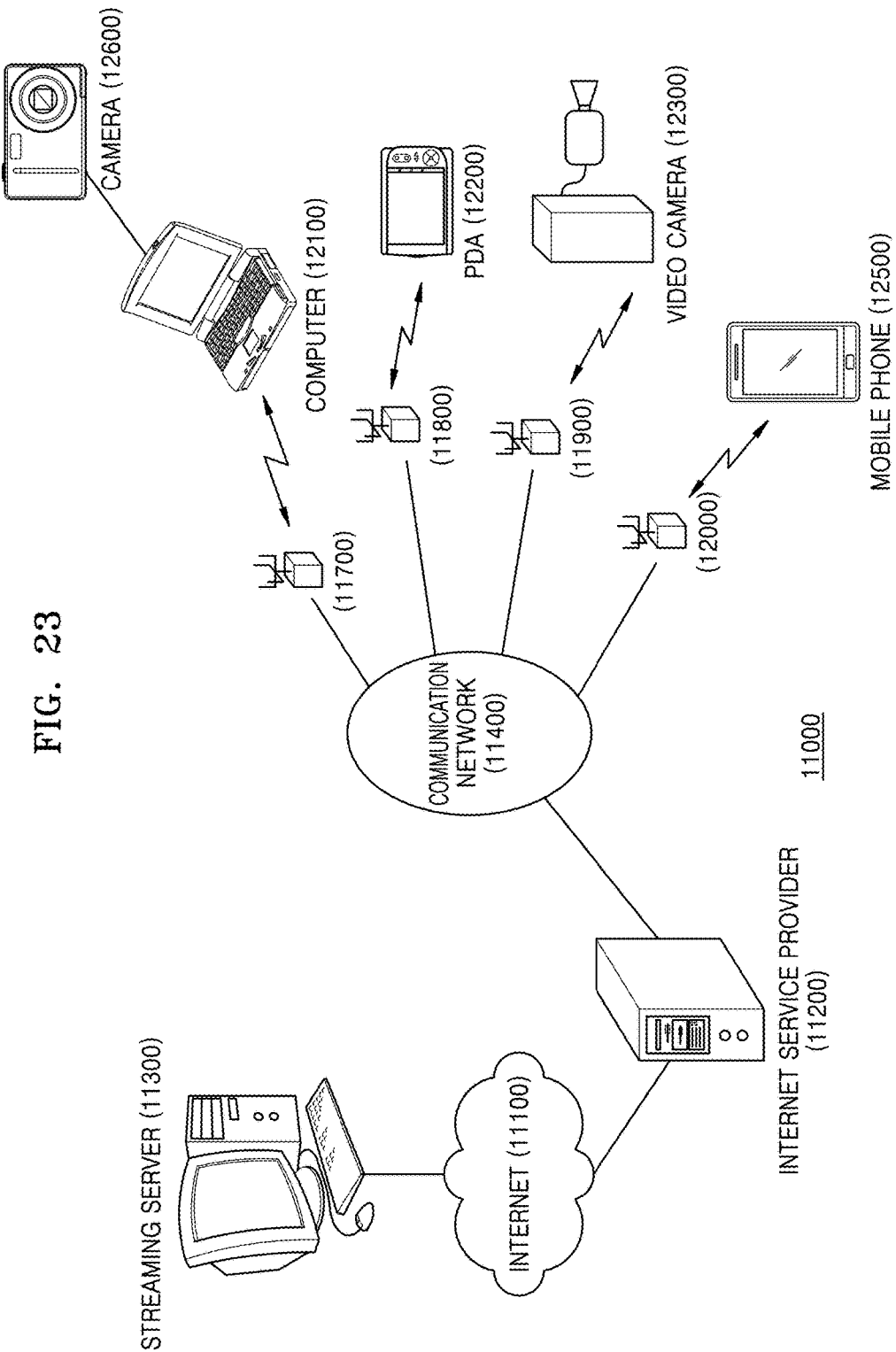
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
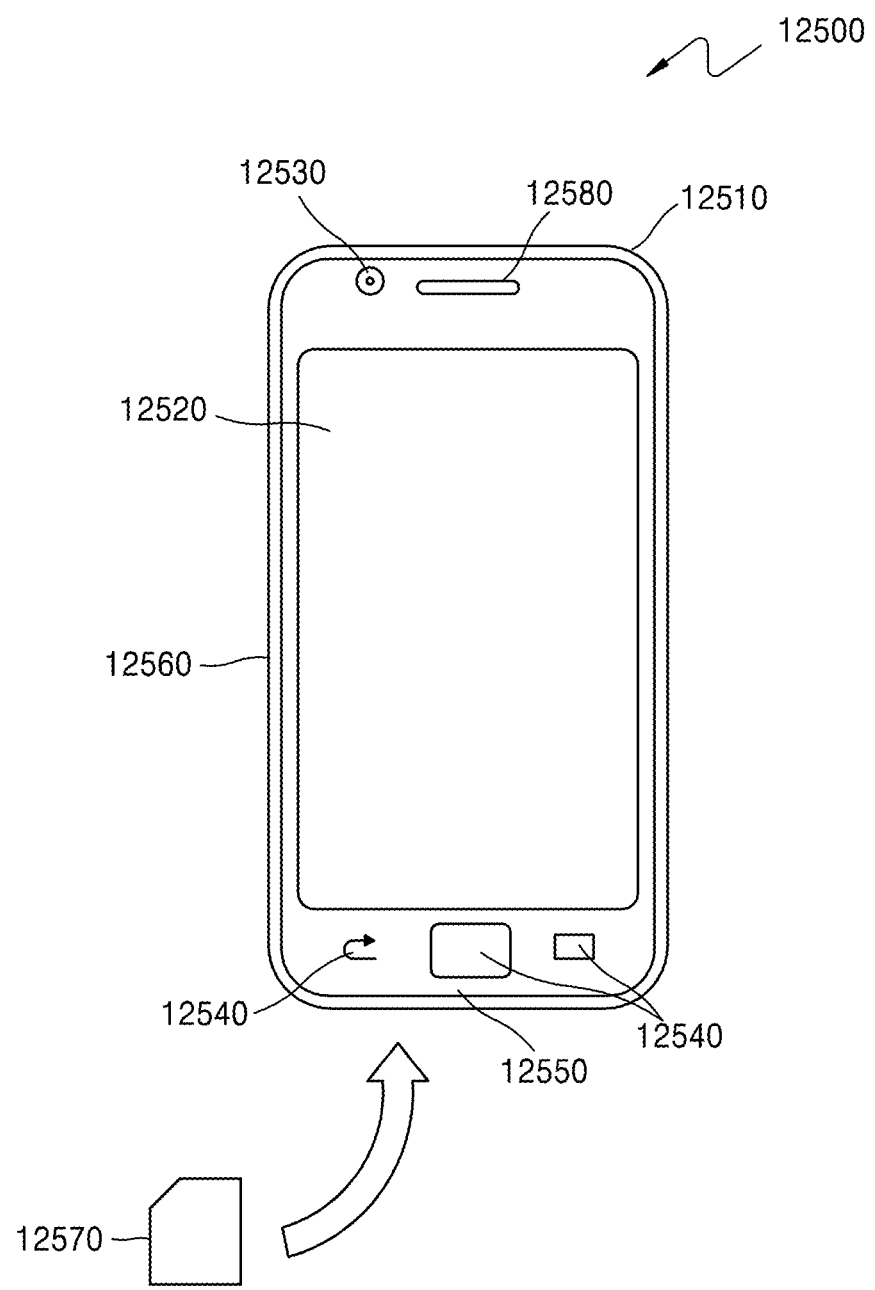
FIGS. 24 and 25 illustrate an external structure and an internal structure of a mobile phone to which a video encoding method and a video decoding method of the present invention are applied, according to various embodiments.

However, the content supply system 11000 is not limited to the structure illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded by the camera 12600 or the computer 12100. Software for video encoding and decoding may be stored in a computer-readable recording medium, e.g., a CD-ROM disc, a floppy disc, a hard disc drive, an SSD, or a memory card, which may be accessible by the computer 12100.

If video is captured by a camera built in the mobile phone 12500, video data may be received from the mobile phone 12500.

The video data may be encoded by a large scale integrated circuit (LSI) system installed in the video camera 12300, the mobile phone 12500, or the camera 12600.

The content supply system 11000 according to an embodiment may encode content recorded by a user using the video camera 12300, the camera 12600, the mobile phone 12500, or another imaging device, e.g., content recorded during a concert, and transmit the encoded content to the streaming server 11300. The streaming server 11300 may transmit the encoded content data in a type of a streaming content to other clients that have requested the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of the video encoding apparatus and the video decoding apparatus of the present invention.

The mobile phone 12500 included in the content supply system 11000 according to an embodiment will now be described in greater detail with reference to FIGS. 24 and 25.

FIG. 24 illustrates an external structure of the mobile phone 12500 to which the video encoding method and the video decoding method of the present invention are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The smartphone 12510 includes an operation panel 12540 including a control button and a touch panel. If the display screen 12520 is a touch screen, the operation panel 12540 further includes a touch sensing panel of the display screen 12520. The smartphone 12510 includes a speaker 12580 for outputting voice and sound or another type of sound output unit, and a microphone 12550 for inputting voice and sound or another type of sound input unit. The smartphone 12510 further includes the camera 12530, such as a charge-coupled device (CCD) camera, to capture video and still images. The smartphone 12510 may further include a storage medium 12570 for storing encoded or decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
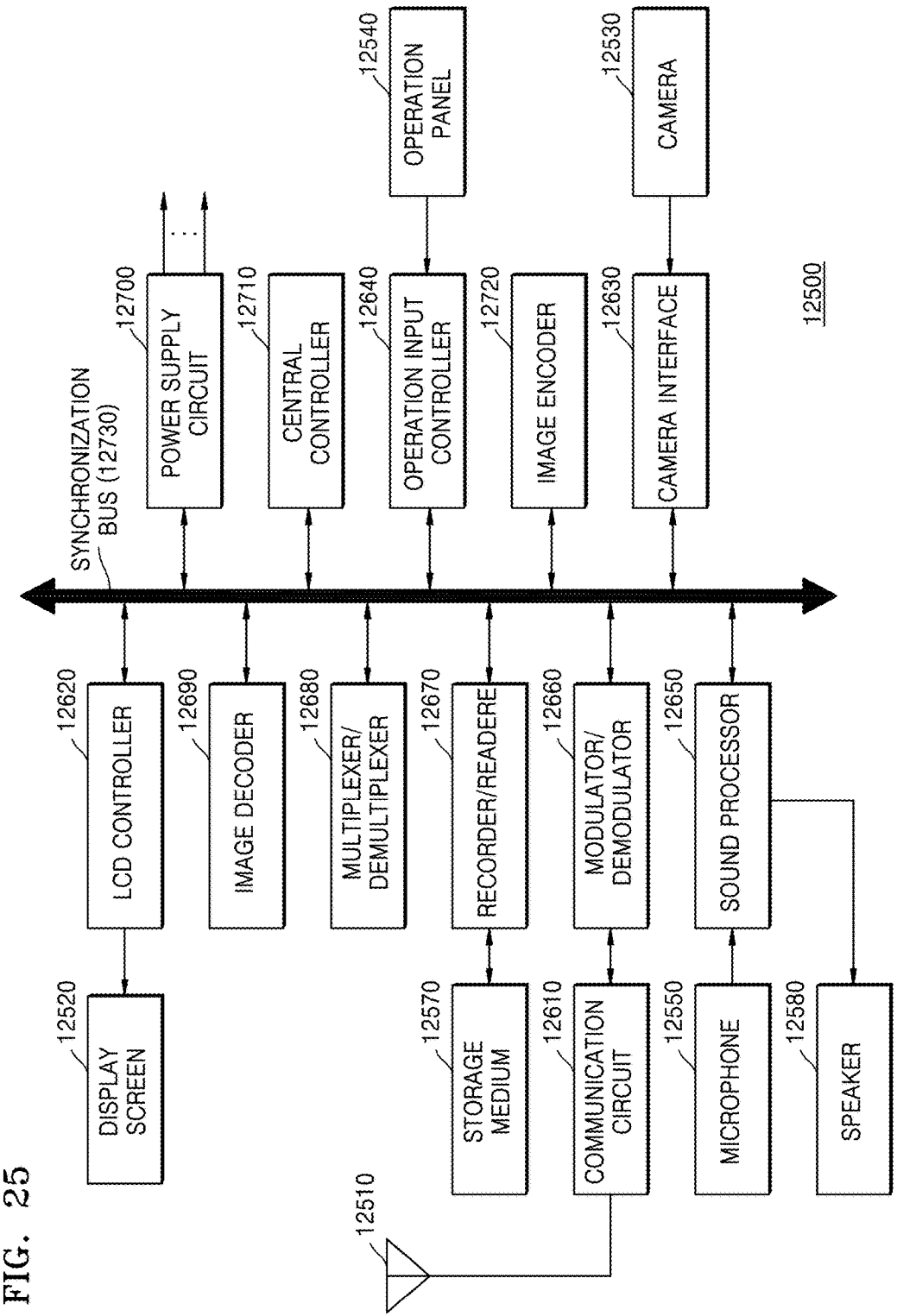

FIG. 25 illustrates an internal structure of the mobile phone 12500. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a power on' state, the power supply circuit 12700 supplies power to all of the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under the control of the central controller 12710. For example, the sound processor 12650 may generate a digital sound signal, the video encoder 12720 may generate a digital image signal, and text data of a message may be generated via the operation panel 12540 and the operation input controller 12640. When a digital signal is transmitted to the modulator/demodulator 12660 under the control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under the control of the central controller 12710. The digital sound signal may be transformed into a transmission signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under the control of the central controller 12610, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the above-described video encoding apparatus of the present invention. The image encoder 12720 may transform the image data received from the camera 12530 into image data compressed and encoded according to the above-described video encoding method of the present invention, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the encoded image data may be transformed into a transmission signal via the modulator/demodulator 12660 and the communication circuit 12610, and may be transmitted via the antenna 12510.

While the mobile phone 12500 receives communication data from the outside, frequency recovery and ADC are performed on a signal received via the antenna 12510 to transform the signal into a digital signal. The modulator/demodulator 12660 demodulates a frequency band of the digital signal. The frequency-band modulated digital signal is transmitted to the video decoder 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650 under the control of the central controller 12710, and the analog sound signal is output via the speaker 12580.

When in the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the above-described video decoding apparatus of the present invention. The image decoder 12690 may decode the encoded video data to obtain reconstructed video data and provide the reconstructed video data to the display screen 12520 via the LCD controller 12620, by using the above-described video decoding method of the present invention.

Thus, the video data of the video file accessed from the Internet website may be displayed on the display screen 12520. At the same time, the sound processor 12650 may transform audio data into an analog sound signal, and provide the analog sound signal to the speaker 12580. Thus, audio data contained in the video file accessed from the Internet website may also be reproduced via the speaker 12580.

The mobile phone 12500 or another type of communication terminal may be a transceiving terminal including both the video encoding apparatus and the video decoding apparatus of the present invention, may be a transmitting terminal including only the video encoding apparatus of the present invention, or may be a receiving terminal including only the video decoding apparatus of the present invention.

Figure 26:
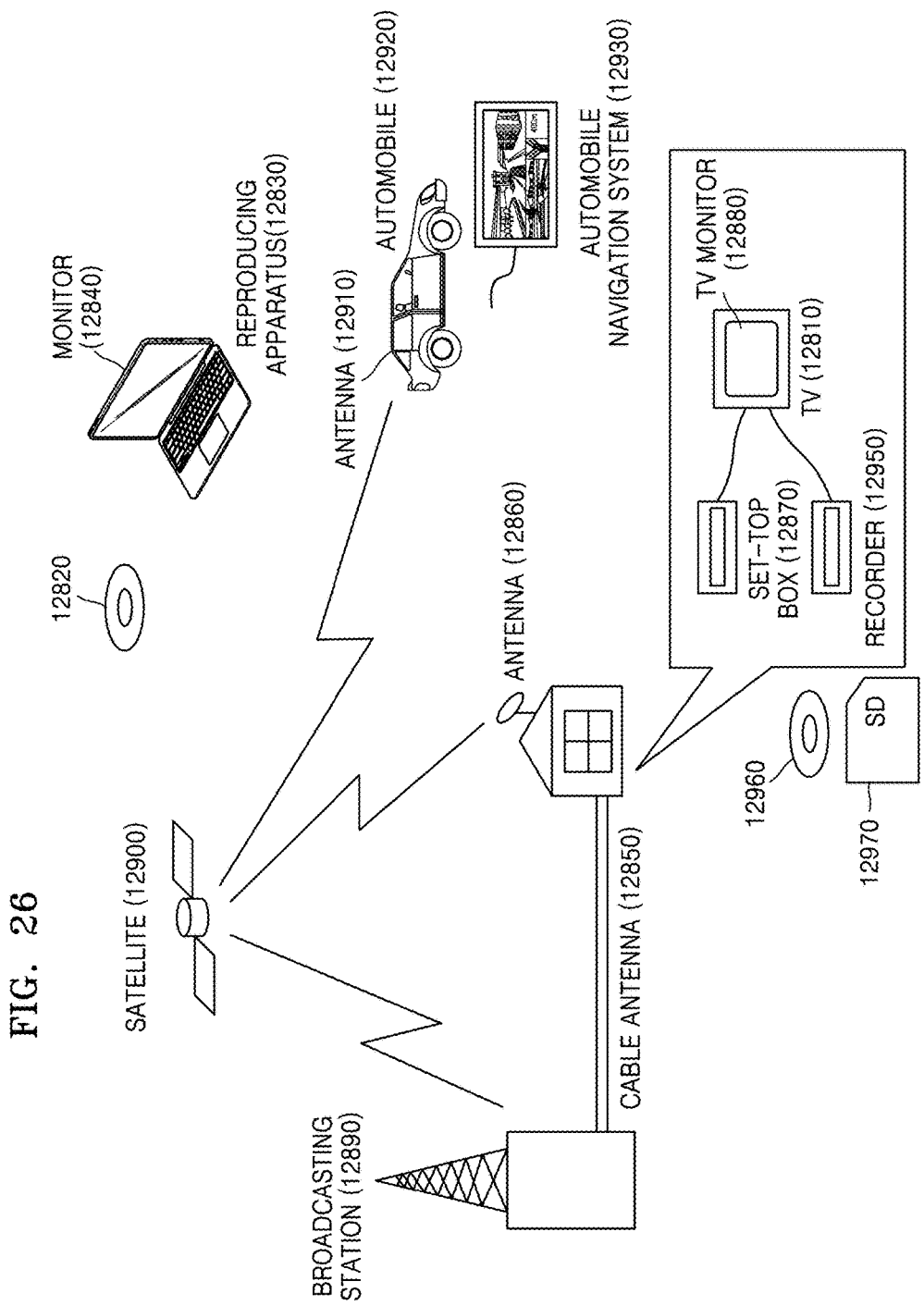
FIG. 26 illustrates a digital broadcasting system employing a communication system, according to various embodiments.

A communication system according to the present invention is not limited to the communication system described above with reference to FIG. 24. For example, FIG. 26 illustrates a digital broadcasting system employing a communication system, according to various embodiments. The digital broadcasting system of FIG. 26 according to an embodiment may receive a digital broadcast transmitted via a satellite or terrestrial network by using the video encoding apparatus and the video decoding apparatus of the present invention.

In detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present invention is implemented in a reproducing apparatus 12830, the reproducing apparatus 12830 may read and decode an encoded video stream recorded on a storage medium 12820, such as a disc or a memory card. Thus, a reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present invention may be installed. Data output from the set-top box 12870 may also be reproduced on a TV monitor 12880.

As another example, the video decoding apparatus of the present invention may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by the video encoding apparatus of the present invention and may then be recorded and stored in a storage medium. In detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus of the present invention according to an embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 26. For example, the computer 12100 and the TV receiver 12810 may also not include the camera 12530, the camera interface 12630, and the image encoding unit 12720 of FIG. 26.

FIG. 27 is a diagram illustrating a network structure of a cloud computing system using a video encoding apparatus and a video decoding apparatus, according to various embodiments.

The cloud computing system of the present invention may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided with cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, and personal credit information, such as addresses and names. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. Thus, for example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus of the present invention described above with reference to FIGS. 1A-20. As another example, the user terminal may include the video encoding apparatus of the present invention described above with reference to FIGS. 1A-20. Alternatively, the user terminal may include both the video encoding apparatus and the video decoding apparatus of the present invention described above with reference to FIGS. 1A-20.

Various applications of a video encoding method, a video decoding method, a video encoding apparatus, and a video decoding apparatus according to embodiments described above with reference to FIGS. 1A-20 have been described above with reference to FIGS. 21-27. However, various embodiments of storing the video encoding method and the video decoding method described above with reference to FIGS. 1A-20 in a storage medium or implementing the video encoding apparatus and the video decoding apparatus described above with reference to FIGS. 1A-20 in a device are not limited to the embodiments described above with reference to FIGS. 21-27.

The present invention can be embodied as computer readable codes on a computer readable recording medium. The computer readable recording medium is any type of recording device that stores data which can thereafter be read by a computer system. Examples of the computer-readable recording medium include ROM, RAM, CD-ROMs, magnetic tapes, floppy discs, and optical data storage media. The computer readable recording medium can also be distributed over network coupled computer systems so that the computer readable code is stored and executed in a distributive manner.

While the present invention has been particularly shown and described with reference to exemplary embodiments thereof, it will be understood that various changes in form and details may be made therein without departing from the spirit and scope of the following claims.

The invention claimed is:

1. A multi-layer video decoding method performed by at least one processor comprising:
    obtaining an index of an output layer subset for each of output layer sets including at least one output layer from among layers of each of the output layer sets including a target output layer set, from a multi-layer video bitstream;
    determining one of at least three output layer subsets for each of the output layer sets by using the obtained index; and
    decoding an image including an output layer included in the determined output layer subset,
    wherein when a value of the index of the output layer subset is a predetermined first value, the one of the at least three output layer subsets for each of the output layer sets includes all layers in each of the output layer sets including the target layer set,
    wherein when the value of the index of the output layer subset is a predetermined second value, the one of the at least three output layer subsets for each of the output layer sets only includes a layer of which a layer identifier value is the highest value among all layers in each of the output layer sets including the target layer set, and
    wherein when the value of the index of the output layer subset is a predetermined third value, the one of the at least three output layer subsets for each of the output layer sets is determined based on a flag which indicates whether each of layers in each of the output layer sets including the target layer set is an output layer which is obtained from the bitstream.

2. The multi-layer video decoding method of claim 1, further comprising determining one of a plurality of output layer sets included in an output layer set group, as the target output layer set.

3. The multi-layer video decoding method of claim 1, wherein the determining of the one of the at least three output layer subsets by using the obtained index comprises determining an output layer subset including a lowermost layer from among the layers included in the target output layer set, by using the obtained index.

4. The multi-layer video decoding method of claim 1, wherein the determining of the one of the at least three output layer subsets by using the obtained index comprises, when the obtained index has a predetermined third value,
    obtaining a flag representing whether each of the layers included in the target output layer set is an output layer; and
    determining an output layer from among the layers included in the target output layer set, by using the obtained flag, and determining an output layer subset including the determined output layer.

5. The multi-layer video decoding method of claim 1, wherein the obtaining of the index comprises:
    obtaining a Video Parameter Set Network Abstraction Layer (VPS NAL) unit including the index from the multi-layer video bitstream; and
    obtaining the index by using the VPS NAL unit.

6. The multi-layer video decoding method of claim 1, wherein the determining of the one of the at least three output layer subsets by using the acquired index comprises determining an output layer subset including a layer except for a layer for auxiliary image data from among the layers included in the target output layer set, by using the obtained index.

7. A multi-layer video encoding method performed by at least one processor comprising:
    encoding image data to a multi-layer encoded image;
    determining at least one of encoded layers of each of output layer sets including a target output layer set, as an output layer;
    generating an index of at least three output layer subsets for each of the output layer sets including at least one output layer from among the encoded layers of each of the output layer sets including the target output layer set, based on the determined output layer; and generating a bitstream including the generated index and the multi-layer encoded image, wherein a value of the index of the output layer subset is generated to be a predetermined first value to be used to determine one of the at least three output layer subsets for each of the output layer sets which includes all layers in each of output layer sets including the target output layer set, wherein the value of the index of the output layer subset is generated to be a predetermined second value to be used to determine the one of the at least three output layer subsets for each of the output layer sets which only includes a layer of which a layer identifier value is the highest value among all layers in each of output layer sets including the target layer set the target output layer set, and wherein the value of the index of the output layer subset is generated to be a predetermined third value to be used to determine the one of the at least three output layer subsets for each of the output layer sets which includes at least one layer among all layers in each of output layer sets including the target output layer set which is based on a flag which indicates whether each of layers in each of output layer sets including the target output layer set is an output layer which is obtained from the bitstream.

8. The multi-layer video encoding method of claim 7, wherein the determining of the at least one of the encoded layers of the target output layer set, as the output layer, comprises determining as the output layer at least one of layers of each of a plurality of output layer sets included in an output layer set group including the target output layer set.

9. The multi-layer video encoding method of claim 7, wherein the generating of the index comprises, when a lowermost layer among the layers included in the target output layer set is determined as the output layer, generating the index to have a predetermined fourth value.

10. The multi-layer video encoding method of claim 7, wherein the generating of the index comprises:
   generating the flag representing whether each of the layers included in the target output layer set is the output layer; and
   generating the index to have a predetermined third value.

11. The multi-layer video encoding method of claim 7, wherein the generating of the index comprises, when a layer except for a layer for auxiliary image data from among the layers included in the target output layer set is determined as the output layer, generating the index to have a predetermined fifth value.

12. The multi-layer video encoding method of claim 7, wherein the generating of the bitstream including the generated index and the multi-layer encoded image comprises:
   generating a Video Parameter Set Network Abstraction Layer (VPS NAL) unit including the generated index and
   generating a bitstream including the VPS NAL unit.

13. A multi-layer video decoding apparatus comprising:
   at least one processor configured to obtain a multi-layer video bitstream including an encoded image, to obtain an index of an output layer subset for each of the output layer sets including at least one output layer from among layers of each of the output layer sets including a target output layer set, from the multi-layer video bitstream, to determine one of at least three output layer subsets by using the obtained index, and to decode an image including an output layer included in the determined output layer subset,
   wherein when a value of the index of the output layer subset is a predetermined first value, the one of the at least three output layer subsets for each of the output layer sets includes all layers in each of output layer sets including the target layer set,
   wherein when the value of the index of the output layer subset is a predetermined second value, the one of the at least three output layer subsets for each of the output layer sets only includes a layer of which a layer identifier value is the highest value among all layers in each of output layer sets including the target layer set, and
   wherein when the value of the index of the output layer subset is a predetermined third value, the one of the at least three output layer subsets for each of the output layer sets is determined based on a flag which indicates whether each of layers in each of output layer sets including the target layer set is an output layer which is obtained from the bitstream.

* * * * *